(12) United States Patent
Uchida

(10) Patent No.: US 7,123,308 B2
(45) Date of Patent: Oct. 17, 2006

(54) VIDEO DATA CORRECTION CAPABLE OF EXACTLY CORRECTING HUE, CHROMA AND/OR LUMINANCE SIGNAL

(75) Inventor: Tomoaki Uchida, Chiba-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 671 days.

(21) Appl. No.: 10/384,696

(22) Filed: Mar. 11, 2003

(65) Prior Publication Data

US 2003/0174222 A1 Sep. 18, 2003

(30) Foreign Application Priority Data

Mar. 18, 2002 (JP) ............................. P2002-073781
Oct. 1, 2002 (JP) ............................. P2002-288406

(51) Int. Cl.
*H04N 9/64* (2006.01)
(52) U.S. Cl. ...................................... 348/649; 348/654
(58) Field of Classification Search ................ 348/649,
348/654, 663, 666, 674, 675, 651, 628, 624,
348/222.1, 223.1, 254–256; 386/9, 10, 17,
386/44; 345/591, 593, 600, 604
See application file for complete search history.

(56) References Cited

U.S. PATENT DOCUMENTS

| 4,463,371 | A | * | 7/1984 | Lewis, Jr. .................... 348/539 |
| 4,554,576 | A | | 11/1985 | Kao |
| 4,558,351 | A | | 12/1985 | Fling et al. |
| 4,667,223 | A | * | 5/1987 | Flamm ........................ 348/651 |
| 4,688,096 | A | * | 8/1987 | Campbell et al. ........... 348/614 |
| 4,710,892 | A | * | 12/1987 | Fling .......................... 708/440 |
| 4,788,586 | A | * | 11/1988 | Eckenbrecht ............... 348/649 |
| 4,954,881 | A | * | 9/1990 | Kaye .......................... 348/577 |
| RE34,169 | E | * | 1/1993 | Osburn et al. .............. 348/645 |
| 5,402,181 | A | * | 3/1995 | Jenison ....................... 348/651 |
| 5,764,308 | A | | 6/1998 | Lee |
| 5,999,230 | A | * | 12/1999 | Tanabe ....................... 348/649 |
| 6,211,923 | B1 | * | 4/2001 | Desprez-le Goarant ..... 348/654 |
| 2003/0193579 | A1 | * | 10/2003 | Mori et al. .............. 348/222.1 |

FOREIGN PATENT DOCUMENTS

| JP | 10-145805 | 5/1998 |
| JP | 2001-128189 | 5/2001 |
| WO | 99/34610 A1 | 7/1999 |

\* cited by examiner

*Primary Examiner*—Victor R. Kostak
(74) *Attorney, Agent, or Firm*—Nath & Associates PLLC; Gary M. Nath; Gregory B. Kang

(57) ABSTRACT

An angle calculation unit calculates an angle formed by color difference signals R-Y, B-Y of each input pixel. Correction gain calculation units use the angle as a parameter to generate correction gains of hue, chroma, luminance (Y) gamma, and chroma (C) gamma for only correction regions. Accumulators accumulate the respective correction gains. In a circuit including from a multiplier (10) to a multiplier (18), the color difference signals R-Y, B-Y are multiplied by the correction gains of hue and chroma to correct the hue and chroma. A luminance/color difference gamma processing unit uses a correction function and correction gains of Y, C gammas to gamma-correct a luminance signal Y and color difference signals R-Y, B-Y.

60 Claims, 6 Drawing Sheets $F_{L1} = T - \theta 1:$
if$(F_{L1} < 0)$ $F_{L1} = 0:$ ···(3)

$F_{L2} = \theta 2 - T:$
if$(F_{L2} < 0)$ $F_{L2} = 0:$ ···(4)

$M12 = \text{Min}(F_{L1}, F_{L2}):$ ···(5)

$F_{L0} = \theta 0 - T:$ ···(6)

$M012 = \text{Min}(F_{L0}, F_{L1}):$
$M012 = \text{Max}(M012, -F_{L2}):$ ···(7)

VIDEO DATA CORRECTION CAPABLE OF EXACTLY CORRECTING HUE, CHROMA AND/OR LUMINANCE SIGNAL

BACKGROUND OF THE INVENTION

1. Field of the Invention

The present invention relates to a video correction apparatus and method in which hue, chroma, and luminance of a video signal are corrected, a video correction program, and a recording medium on which the program is recorded.

2. Description of the Related Art

There are various types of display for displaying a video signal, and chromaticity points of three primary colors disperse for various display types. Further chromaticity points disperse for displays of the same type. Furthermore even in the video signal generated by an image pickup apparatus, deviations of tone (hue or chroma) and/or gradation (luminance) occur because of dispersion of three primary colors in an image pickup apparatus or difference in image pickup condition. Then, it is sometimes necessary to correct the hue, chroma, and luminance.

Meanwhile, as a base band video signal, either three primary colors signals of red (R), green (G), blue (B), or luminance signal (Y), and two color difference signals (R-Y, B-Y, or Pb, Pr) are used. The signals displayed in the display are three primary colors signals of R, G, B. However, when it is necessary to correct the hue or chroma, the color difference signals are processed more easily than the three primary colors signals, and therefore the color difference signals are generally used as the signals to be subjected to the correction processing of the hue or chroma. It is to be noted that the three primary colors signals, and luminance and color difference signals can easily be converted to each other by linear matrix computation.

Examples of a related-art correction processing of the hue and chroma include one example of a computation processing represented by the following equations (1), (2). In the equations (1), (2), R-Y, B-Y denote the color difference signals before the correction, r-y, b-y denote the color difference signals after the correction, and A1, A2 are coefficients. As well known, two color difference signals are represented by a plane (color difference plane) including two axes crossing at right angles to each other. T1, T2 in the equations (1), (2) denote correction angles on the color difference plane.

$$(b\text{-}y) = A1 \times \cos(T1) \times (B\text{-}Y) + A1 \times \sin(T2) \times (R\text{-}Y) \quad (1)$$

$$(r\text{-}y) = -A2 \times \sin(T1) \times (B\text{-}Y) + A2 \times \cos(T2) \times (R\text{-}Y) \quad (2)$$

When the coefficients A1, A2 are different in the equations (1), (2), amplitudes (chroma) of the color difference signals r-y, b-y can individually be set. When the angles T1, T2 are different, rotation angles of the color difference signals R-Y, B-Y are different, and therefore the hue can non-uniformly be corrected. When the coefficients A1, A2 and angles T1, T2 are the same, the chroma and hue can uniformly be corrected. In any case, all regions on the color difference plane whose axes are two color difference signals change in the correction processing by the equations (1), (2).

As other related-art examples, and color correction circuits for correcting the hue and chroma in a specific range, there are Japanese Patent Application Laid-Open Nos. 10(1998)-145805 and 2001-128189.

Since the whole hue is corrected in the related-art correction processing by the equations (1), (2), there is a serious disadvantage that the hue or chroma cannot be corrected only in a specific angle region on the color difference plane as a specific hue region. The color correction circuit described in the Japanese Patent Application Laid-Open No. 2001-128189 is an example of the correction processing in which this disadvantage is avoided. According to this color correction circuit, only the specific angle region is set as the correction region, and the hue or chroma of pixels in the correction region can be corrected.

However, the color correction circuit of the above-described publication has a problem that the hue of all the pixels in an angle region surrounded with two isochromatic lines is corrected in a direction crossing at right angles to an isochromatic line which is a center line of the two isochromatic lines, and the chroma of all the pixels is corrected in a direction parallel to the center isochromatic line. When the angle region as the correction region is enlarged, the hue or chroma is exactly corrected in the vicinity of the center isochromatic line, but the hue or chroma cannot exactly be corrected in a region distance from the center isochromatic line. Therefore, there is a problem that a broad angle region cannot be the correction region.

Moreover, there is a problem that the hue or chroma can be corrected, but the luminance signal (gradation) cannot be corrected in accordance with the correction of the hue or chroma. Furthermore, when the luminance signal is corrected, the chroma apparently changes. Therefore, the chroma has to be also corrected in accordance with the correction of the luminance signal, but there is a problem that the chroma changing with the correction of the luminance signal cannot be corrected.

In the related art, a practical video correction apparatus and method or a video correction program has not heretofore been found in which the hue, chroma, and luminance can be corrected to be optimum in consideration of balance of video and/or each element of the hue, chroma, and luminance can freely be corrected. There has increasingly been a demand for a higher image quality with respect to an image to be displayed in the display, and there has been a sincere demand for a video correction apparatus and method or video correction program in which the video can arbitrarily be corrected to be optimum. At this time, the video correction apparatus and method or video correction program can preferably be realized easily and inexpensively without complicating a constitution or step.

SUMMARY OF THE INVENTION

The present invention has been developed in consideration of these problems, and an object of the present invention is to provide a video correction apparatus and method in which hue or chroma can exactly be corrected even with a broad angle region as a correction region, a video correction program for the exact correction, and a recording medium on which the program for the exact correction is recorded. Another object of the present invention is to provide a video correction apparatus and method in which hue or chroma can be corrected only in one or a plurality of specific correction regions and a luminance signal can be corrected in accordance with the correction of the hue or chroma, a video correction program for the correction, and a recording medium on which the program for the correction is recorded.

Further object of the present invention is to provide a video correction apparatus and method in which the chroma changing with the correction of the luminance-signal can be corrected, a video correction program for the correction, and a recording medium on which the program for the correction is recorded. Still further object of the present invention is to easily and inexpensively realize a video correction apparatus and method in which video can arbitrarily be corrected to be optimum, a video correction program for the optimum correction, and a recording medium on which the program for the optimum correction is recorded.

To achieve the objects, there is provided a video correction apparatus for setting one or a plurality of angle regions on a color difference plane formed by first and second axes as correction regions, and correcting video in the correction regions, when one of first and second color difference signals which are color signal components of a pixel of a video signal is used as the first axis, and the other of the first and second color difference signals is used as the second axis crossing at right angles to the first axis, the apparatus comprising: angle calculation means for calculating an angle formed by components of the first and second color difference signals of each input pixel on the color difference plane; hue correction gain calculation means for using the angle of each input pixel calculated by the angle calculation means as a parameter to set a hue correction gain for correcting hue of the pixel of the video signal to zero outside the correction regions and to calculate the hue correction gain for correcting the hue of the pixel in each correction region based on a hue correction gain calculation equation for generating a predetermined hue correction gain for each correction region; and hue correction means for correcting the hue of the pixel in each correction region by a calculation using the first and second color difference signals and the hue correction gain.

Moreover, to achieve the object, there is provided a video correction apparatus for setting a plurality of angle regions on a color difference plane formed by first and second axes as a plurality of correction regions, and correcting video in the correction regions, when one of first and second color difference signals which are color signal components of a pixel of a video signal is used as the first axis, and the other of the first and second color difference signals is used as the second axis crossing at right angles to the first axis, the apparatus comprising: angle calculation means for calculating an angle formed by components of the first and second color difference signals of each input pixel on the color difference plane; a plurality of hue correction gain calculation means for using the angle of each input pixel calculated by the angle calculation means as a parameter to set a hue correction gain for correcting hue of the pixel of the video signal to zero outside the correction regions and to calculate the hue correction gain for correcting the hue of the pixel in each correction region with respect to the plurality of correction regions based on a hue correction gain calculation equation for generating a predetermined hue correction gain for each correction region; first accumulation means for accumulating the hue correction gains for the plurality of correction regions calculated by the plurality of hue correction gain calculation means; and hue correction means for correcting the hue of the pixel in each correction region by a calculation using the first and second color difference signals and the hue correction gains accumulated by the first accumulation means.

Furthermore, to achieve the objects, there is provided a video correction method for setting one or a plurality of angle regions on a color difference plane formed by first and second axes as correction regions, and correcting video in the correction regions, when one of first and second color difference signals which are color signal components of a pixel of a video signal is used as the first axis, and the other of the first and second color difference signals is used as the second axis crossing at right angles to the first axis, the method comprising: an angle calculation step of calculating an angle formed by components of the first and second color difference signals of each input pixel on the color difference plane; a hue correction gain calculation step of using the angle of each input pixel calculated in the angle calculation step as a parameter to set a hue correction gain for correcting hue of the pixel of the video signal to zero outside the correction regions and to calculate the hue correction gain for correcting the hue of the pixel in each correction region based on a hue correction gain calculation equation for generating a predetermined hue correction gain for each correction region; and a hue correction step of correcting the hue of the pixel in each correction region by a calculation using the first and second color difference signals and hue correction gain.

Additionally, to achieve the objects, there is provided a video correction method for setting a plurality of angle regions on a color difference plane formed by first and second axes as a plurality of correction regions, and correcting video in the correction regions, when one of first and second color difference signals which are color signal components of a pixel of a video signal is used as the first axis, and the other of the first and second color difference signals is used as the second axis crossing at right angles to the first axis, the method comprising: an angle calculation step of calculating an angle formed by components of the first and second color difference signals of each input pixel on the color difference plane; a plurality of hue correction gain calculation steps of using the angle of each input pixel calculated in the angle calculation step as a parameter to set a hue correction gain for correcting hue of the pixel of the video signal to zero outside the correction regions and to calculate the hue correction gain for correcting the hue of the pixel in each correction region with respect to the plurality of correction regions based on a hue correction gain calculation equation for generating a predetermined hue correction gain for each correction region; a first accumulation step of accumulating the hue correction gains for the plurality of correction regions calculated by the plurality of hue correction gain calculation steps; and a hue correction step of correcting the hue of the pixel in each correction region by a calculation using the first and second color difference signals and the hue correction gains accumulated by the first accumulation step.

Moreover, to achieve the object, there is provided a video correction program for setting one or a plurality of angle regions on a color difference plane formed by first and second axes as correction regions, and correcting video in the correction regions, when one of first and second color difference signals which are color signal components of a pixel of a video signal is used as the first axis, and the other of the first and second color difference signals is used as the second axis crossing at right angles to the first axis, the program comprising: an angle calculation step of calculating an angle formed by components of the first and second color difference signals of each input pixel on the color difference plane; a hue correction gain calculation step of using the angle of each input pixel calculated in the angle calculation step as a parameter to set a hue correction gain for correcting hue of the pixel of the video signal to zero outside the correction regions and to calculate the hue correction gain for correcting the hue of the pixel in each correction region based on a hue correction gain calculation equation for generating a predetermined hue correction gain for each correction region; and a hue correction step of correcting the hue of the pixel in each correction region by a calculation using the first and second color difference signals and hue correction gain.

Furthermore, to achieve the objects, there is provided a video correction program for setting a plurality of angle regions on a color difference plane formed by first and second axes as a plurality of correction regions, and correcting video in the correction regions, when one of first and second color difference signals which are color signal components of a pixel of a video signal is used as the first axis, and the other of the first and second color difference signals is used as the second axis crossing at right angles to the first axis, the program comprising: an angle calculation step of calculating an angle formed by components of the first and second color difference signals of each input pixel on the color difference plane; a plurality of hue correction gain calculation steps of using the angle of each input pixel calculated in the angle calculation step as a parameter to set a hue correction gain for correcting hue of the pixel of the video signal to zero outside the correction regions and to calculate the hue correction gain for correcting the hue of the pixel in each correction region with respect to the plurality of correction regions based on a hue correction gain calculation equation for generating a predetermined hue correction gain for each correction region; a first accumulation step of accumulating the hue correction gains for the plurality of correction regions calculated in the plurality of hue correction gain calculation steps; and a hue correction step of correcting the hue of the pixel in each correction region by a calculation using the first and second color difference signals and the hue correction gains accumulated in the first accumulation step.

The nature, principle and utility of the invention will become more apparent from the following detailed description when read in conjunction with the accompanying drawings.

DESCRIPTION OF THE PREFERRED EMBODIMENTS

A video correction apparatus and method, video correction program, and recording medium on which the program is recorded will be described hereinafter with reference to the accompanying drawings.

Figure 1:
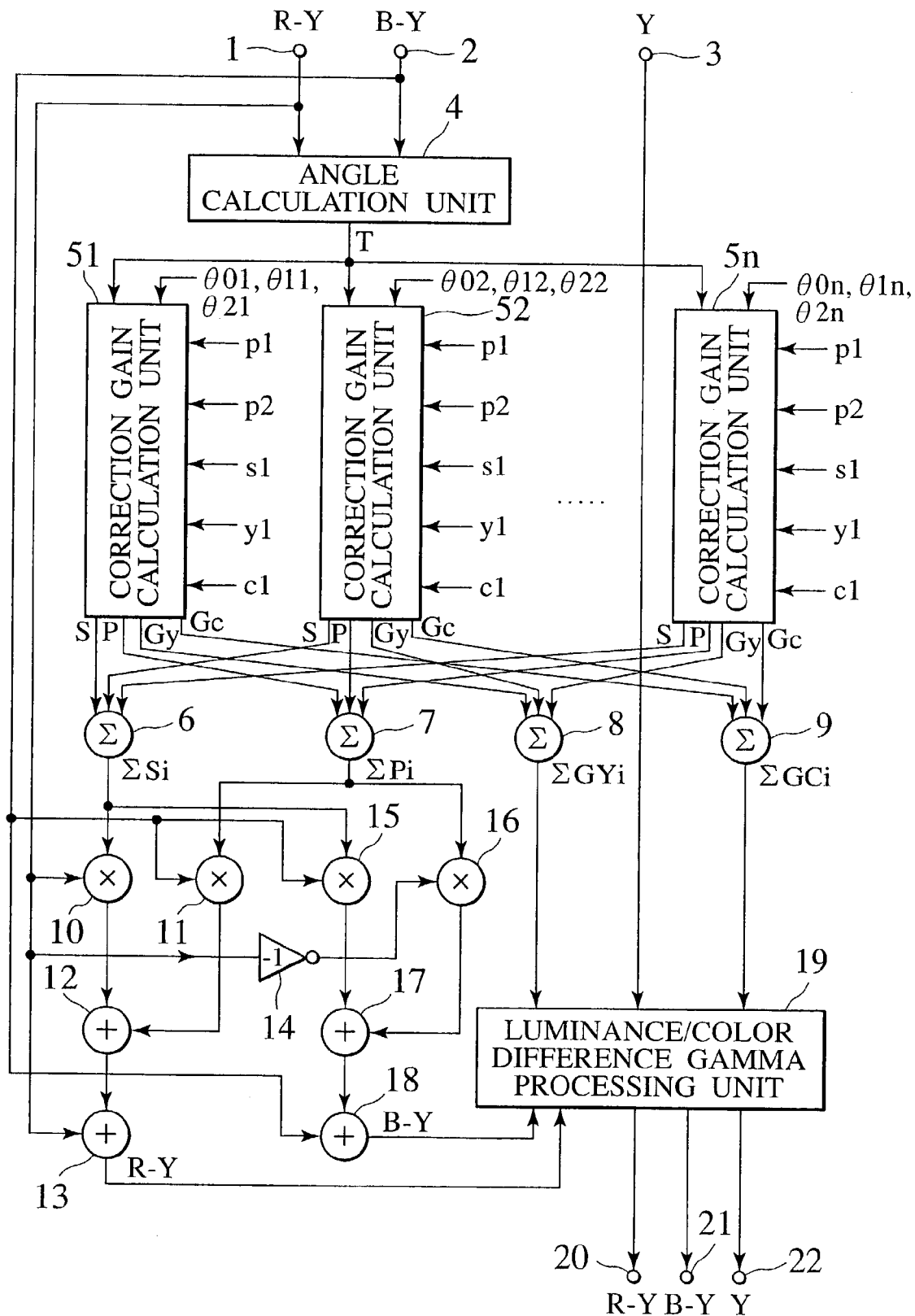
FIG. 1 is a block diagram showing one embodiment of the present invention.

In FIG. 1, color difference signals R-Y, B-Y are inputted into input terminals 1, 2, and are then inputted into an angle calculation unit 4. A luminance signal Y is inputted into an input terminal 3, and is then inputted into a luminance/color difference gamma processing unit 19. The color difference signals R-Y, B-Y and luminance signal Y are successively inputted for each pixel of the video signal as an object of correction. It is to be noted that when the video signals as the objects of correction are three primary colors signals, the three primary colors signals are converted to the color difference signals R-Y, B-Y and luminance signal Y beforehand by linear matrix calculation, and the signals are inputted into the angle calculation unit 4 and luminance/color difference gamma processing unit 19.

Figure 3:
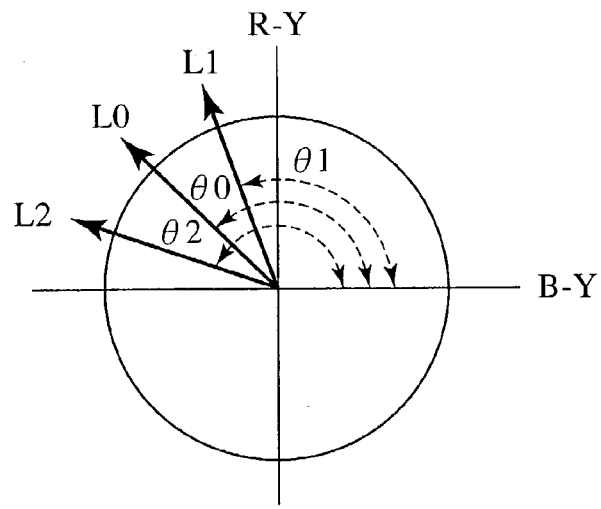
FIG. 3 is a diagram showing a color difference plane.

As shown in FIG. 3, one color difference signal (e.g., B-Y) of the color difference signals R-Y, B-Y is indicated on the abscissa, the other color difference signal (e.g., R-Y) is indicated on the ordinate crossing at right angles to the abscissa, and the color difference signals R-Y, B-Y are represented on a color difference plane. A rotation direction centering on an intersection of R-Y and B-Y axes of the color difference plane represents a hue, and a radial direction represents a chroma. Color signal components of each pixel of a video signal are represented by the color difference signals R-Y, B-Y, and each pixel is positioned on the color difference plane. Moreover, colors such as red, blue, green are positioned on the color difference plane, and each color can be represented by an angle from the B-Y axis.

Figure 2:
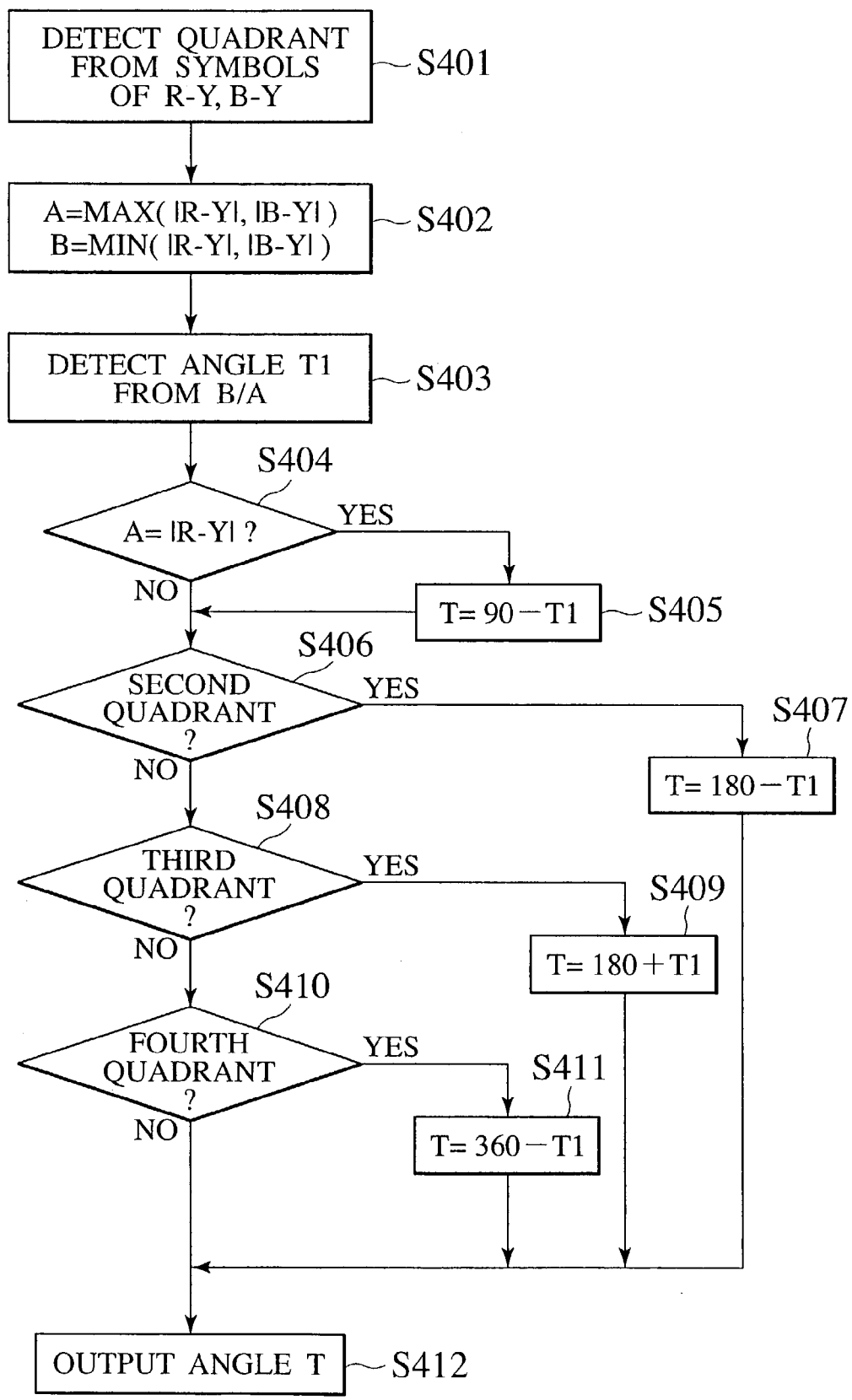
FIG. 2 is a flowchart showing concrete processing in an angle calculation unit 4 in FIG. 1.

The angle calculation unit 4 calculates an angle formed by the input pixels on the color difference plane of FIG. 3 by steps shown as one example in FIG. 2. FIG. 2 shows a flowchart of angle calculation steps in the angle calculation unit 4, but the angle calculation steps in the angle calculation unit 4 may be realized by either software or hardware. In FIG. 2, in step S401, a quadrant on the color difference plane in which each input pixel is positioned is detected from symbols of components of the color difference signals R-Y, B-Y. In step S402, for the color difference signals R-Y, B-Y components, a component having a large absolute value is used as A, and a component having a small absolute value is used as B in calculation.

Subsequently, in step S403, angle T1 is detected from B/A. As apparent from the processing of the step S402, the angle T1 is calculated as 0 to 45°. The angle T1 can be calculated by line approximation or ROM table. It is judged in step S404 whether or not A is |R-Y|, i.e., |R-Y|>|B-Y|. If |R-Y|>|B-Y| is not established, the angle T1 is set as such to angle T. If |R-Y|>|B-Y| is established, T=90−T1 is calculated in step S405. Thereby, $\tan^{-1}((R-Y)/(B-Y))$ is obtained.

The angle T1 to be detected in the step S403 is set to 0 to 45°, because an angle exceeding 45° is inappropriate for the calculation of the angle. If the angle exceeds 45°, a curve of $\tan^{-1}((R-Y)/(B-Y))$ rapidly has a large gradient.

Furthermore, in step S406, data of the quadrant detected in the step S401 is used to judge whether or not the quadrant is a second quadrant. With the second quadrant, in step S407, T=180−T1 is calculated. When the quadrant is not the second quadrant, it is judged in step S408 whether or not the quadrant is a third quadrant. With the third quadrant, in step S409, T=180+T1 is calculated. When the quadrant is not the third quadrant, it is judged in step S410 whether or not the quadrant is a fourth quadrant. With the fourth quadrant, in step S411, T=360−T1 is calculated. Subsequently, finally in step S412, the angle T formed by the respective input pixels on the color difference plane of FIG. 3 is outputted.

By the above-described processing, the angle on the color difference plane of the inputted color difference signals R−Y, B−Y can be obtained in a range of 0 to 360°. The steps S404 to S411 correspond to steps of correcting the angle T1 detected in the step S403 to be the angle T. Moreover, it is seen that the angle T1 is corrected in accordance with the first to fourth quadrants in the steps S404 to S411. At this time, in the first quadrant, the correction processing of the angle T1 to the angle T differs depending on whether or not |R−Y|>|B−Y| is established.

The above-described angle calculation processing in the angle calculation unit 4 comprises: calculating the angle formed by the color difference signals R−Y, B−Y as the angle T1 in the range of 0 to 45°; correcting this angle T1 in accordance with each quadrant; and calculating the angle formed by the color difference signals R−Y, B−Y as T in the range of 0 to 360°. This constitution is effective particularly for constituting the present invention as hardware (video correction apparatus) such as an integrated circuit and using the line approximation to calculate the angle.

When the inputted video signal includes much noise, a low pass filter is preferably used for the color difference signals R−Y, B−Y for use in angle calculation (i.e., the color difference signals R−Y, B−Y inputted into the angle calculation unit 4) in order to reduce the noise. In this case, the angle of the color difference signals R−Y, B−Y can correctly be calculated.

Returning to FIG. 1, the angle T outputted from the angle calculation unit 4 is inputted into correction gain calculation units 51, 52, ..., 5n. Here, n correction gain calculation units are disposed, but one or a plurality of correction gain calculation units may arbitrarily be disposed. The correction gain calculation unit is disposed in accordance with the number of regions in which the hue or chroma is corrected. Therefore, when only the specific color as one angle region on the color difference plane is corrected, one correction gain calculation unit may be disposed. All the correction gain calculation units 51 to 5n have the same constitution.

Here, functions of the correction gain calculation units 51 to 5n will be described. In FIG. 3, L0, L1, L2 are isochromatic lines extending from the intersection of the B−Y and R−Y axes, and angles of the isochromatic lines L0, L1, L2 are θ0, θ1, θ2. The isochromatic line L0 is a center line of correction, and a range of the angles θ1 and θ2 surrounded by the isochromatic lines L1, L2 is a correction region in which the hue, chroma, or luminance is corrected. The angles θ0 to θ2 can arbitrarily be set under the condition of θ1<θ0<θ2.

An angle (θ0−θ1) formed by the isochromatic lines L0, L1 and angle (θ2−θ0) formed by the isochromatic lines L0, L2 may not be the same, but are preferably the same. To set the angle formed by the isochromatic lines L0, L1 to be the same as that formed by the isochromatic lines L0, L2, a correction angle R from the angle θ0 is set, θ0−R is set to θ1, and θ0+R is set to θ2. It is to be noted that when a plurality of correction regions are disposed on the color difference plane, the isochromatic line similar to the isochromatic lines L0 to L2 may be set in a plurality of angle positions.

The angles θ0, θ1, θ2, or the angles θ0 and R for determining the respective correction regions are inputted into the correction gain calculation units 51 to 5n. In FIG. 1, it is assumed that the angles supplied to the correction gain calculation units 51 to 5n are θ0, θ1, θ2, and the angles θ0, θ1, θ2 are angles θ01, θ11, θ21 to θ0n, θ1n, θ2n with respect to the correction gain calculation units 51 to 5n. It is to be noted that it is also possible to superpose and set the correction regions. The angles θ01 to θ0n will generically referred to as the angle θ0, the angles θ11 to θ1n will generically referred to as the angle θ1, and the angles θ21 to θ2n will generically referred to as the angle θ2.

The functions of the correction gain calculation units 51 to 5n will further be described with reference to FIGS. 4A to 4E. Assuming that a function indicating a portion having an angle larger than that of the isochromatic line L1 of FIG. 3 is $F_{L1}$, this function is represented in C language as follows:

$F_{L1}=T-\theta 1;$ if $(F_{L1}<0), F_{L1}=0;$ (3)

Figure 4A:
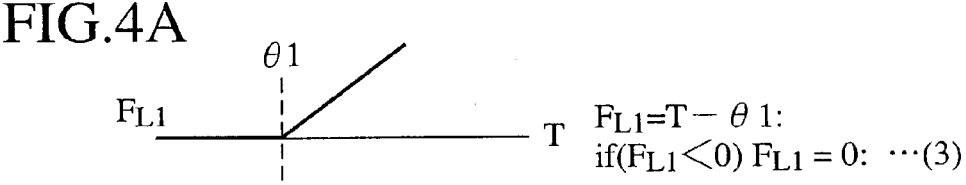
FIGS. 4A to 4E are explanatory views of correction functions for use in correction gain calculation units 51 to 5n in FIG. 1.

This equation (3) represents the characteristic shown in FIG. 4A.

Similarly, assuming that a function indicating a portion having an angle smaller than that of the isochromatic line L2 of FIG. 3 is $F_{L2}$, this function is represented in the C language as follows:

$FL2=\theta 2-T;$ if $(FL2<0), FL2=0;$ (4)

Figure 4B:
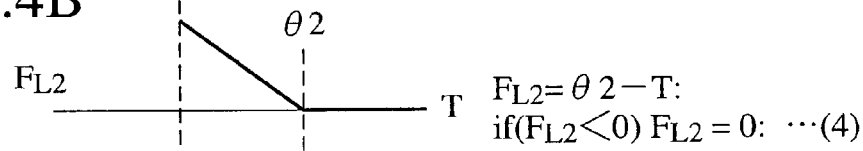

This equation (4) represents the characteristic shown in FIG. 4B.

The correction gain calculation units 51 to 5n generate a first correction function M12 for correcting the video (hue, chroma, luminance) based on the following equation (5).

$M12=\mathrm{Min}(F_{L1}, F_{L2});$ (5)

Figure 4C:

The first correction function M12 selects a smaller one from $F_{L1}$ represented by the equation (3) and $F_{L2}$ represented by the equation (4), and a triangular characteristic having an apex in the angle θ0 is obtained as shown in FIG. 4C. The characteristic of the first correction function M12 is not limited to the triangular shape. Alternatively, an upper limit value may also be set to obtain a trapezoidal or cosine function characteristic. It is to be noted that it is necessary for the first correction function M12 to set the outside of the angles θ1, θ2 as a range outside a correction range to zero.

Moreover, similarly, when a function indicating portions having angles larger and smaller than the angle of the isochromatic line L0 of FIG. 3 is set to $F_{L0}$, and represented in the C language, the following is obtained.

$FL0=\theta 0-T;$ (6)

Figure 4D:
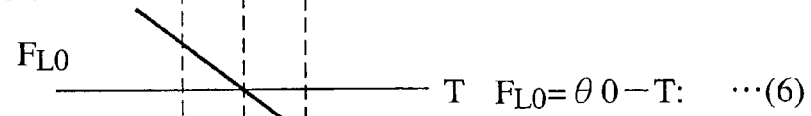

This equation (6) represents the characteristic shown in FIG. 4D.

The correction gain calculation units 51 to 5n generate a second correction function M012 for correcting the video (hue, chroma, or luminance) based on the following equation (7).

$M012=\mathrm{Min}(F_{L0}, F_{L1});$ $M012=\mathrm{Max}(M012, -F_{L2});$ (7)

Figure 4E:
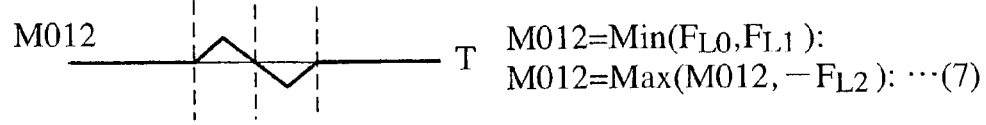

The second correction function M012 selects a smaller one from $F_{L0}$ represented by the equation (6) and $F_{L1}$ represented by the equation (3). Furthermore, a larger one is selected from M012 and $-F_{L2}$ obtained thereby. As shown in FIG. 4E, the second correction function M012 obtained in this manner has a characteristic constituted by combining an upper convex triangular characteristic which has a positive apex in a middle portion between the angles θ1 and θ0 with a lower convex triangular characteristic which has a negative apex in the middle portion between the angles θ0 and θ2. It is necessary for the second correction function M012 to set the outside of the angles θ1, θ2 as the outside of the appropriate range to zero.

Additionally, when θ1=θ0−R, θ1=θ0+R are set, the angle T calculated by the angle calculation unit 4 indicates a value of 0 to 360°. When the angle θ1 or θ2 strides over 0 or 360°, discontinuity is generated in the value of the angle. Then, the correction gain calculation units 51 to 5n correct the angle T for use in the above (3), (4), (6) beforehand by the following equation (8) represented in the C language. It is to be noted that>= in the equation (8) means ≧.

if (T−θ1>=360)T=T−360;

if (θ2−T>=360)T=T+360; (8)

Even when the angle θ1 or θ2 strides over 0° or 360°, but when the angle T is included in a range of the angle θ1 to θ2, the angle T is corrected to be a continuous value, and the discontinuity of the value of the angle T can be prevented from being caused in the range of the angle θ1 to θ2 by the equation (8). Therefore, the first and second correction functions M12, M012 shown in FIGS. 4C, 4E can correctly be generated.

When θ1=θ0−R, θ2=θ0+R are set as the correction region centering on the angle θ0 as described above in the present embodiment, the correction angle R can be set up to nearly 180°, that is, the correction region of θ0±180° can be set.

In addition to the angles θ0, θ1, θ2, coefficients p1, p2, s1, y1, c1 are inputted into the correction gain calculation units 51 to 5n. The coefficients p1, p2 are coefficients for setting a hue correction gain described later to be variable, and the coefficient s1 is a coefficient for setting a chroma correction gain described later to be variable. The coefficient y1 is a coefficient for setting a luminance gamma correction gain described later to be variable, and the coefficient c1 is a coefficient for setting a chroma gamma correction gain described later to be variable. All the coefficients p1, p2, s1, y1, c1 to be inputted into the correction gain calculation units 51 to 5n do not have to be the same with respect to the correction gain calculation units 51 to 5n. When the coefficients p1, p2, s1, y1, c1 are individually set with respect to the correction gain calculation units 51 to 5n, a degree of correction of video can be allowed to differ in a plurality of correction regions.

In the present embodiment, not only the hue and chroma but also the luminance signal are corrected. Furthermore, when the luminance signal is corrected, the chroma apparently changes. Therefore, with the correction of the luminance signal, the chroma is also corrected. As described later, in the present embodiment, in the correction of the luminance signal, a characteristic of gamma curve is imparted to the luminance signal. Moreover, also in the chroma correction performed together with the correction of the luminance signal, the characteristic of gamma curve is imparted to a color difference signal in the same manner as in the luminance correction. Therefore, in the present embodiment, the correction of the luminance signal will be referred to as Y gamma, and the chroma correction performed together with the correction of the luminance signal will be referred to as C gamma.

The correction gain calculation units 51 to 5n generate correction gains P, S, Gy, Gc based on correction gain calculation equations P(T), S(T), Gy(T), Gc(T) represented by the following equations (9) to (12) using the first and second correction functions M12, M012 generated as described above and inputted coefficients p1, p2, si, y1, c1. P denotes a phase correction gain for use in correcting the gain of hue, S denotes a chroma correction gain for use in correcting the gain of chroma, Gy denotes a Y gamma correction gain for use in correcting the gain of Y gamma, and Gc denotes a C gamma correction gain for use in correcting the gain of C gamma.

$P(T)=p1 \times M012+p2 \times M12;$ (9)

$S(T)=s1 \times M12;$ (10)

$Gy(T)=y1 \times M12;$ (11)

$Gc(T)=c1 \times M12;$ (12)

As described with reference to FIG. 4, the first and second correction functions M12, M012 are functions in which the angle T calculated by the angle calculation unit 4 is used as the parameter, and the correction gain calculation equations represented by the equations (9) to (12) are functions in which the angle T is used as the parameter. The first correction function M12 shown in FIG. 4C has a characteristic that a correction amount becomes larger closer to the isochromatic line L0 with the center angle θ0 of the correction region, and also has a characteristic that the pixel in the correction region is corrected in one direction.

On the other hand, the second correction function M012 shown in FIG. 4E has a characteristic that the correction amount becomes zero on the isochromatic line L0 and is maximized in middle portions between the isochromatic line L0 and the isochromatic lines L1, L2. Moreover, the function has a characteristic that the correction direction is inverted in the angle region held between the isochromatic lines L0 and L1 and the angle region held between the isochromatic lines L0 and L2. It is seen that the coefficients p1, p2, s1, y1, c1 are used to set the amplitudes of the first and second correction functions M12, M012 to be variable, and to appropriately set degrees of the correction gains P, S, Gy, Gc generated by the correction gain calculation equations P(T), S(T), Gy(T), Gc(T).

Figure 5A:
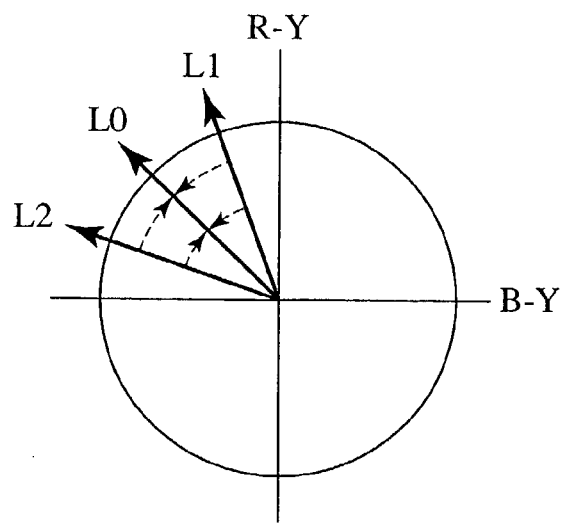
FIGS. 5A and 5B are explanatory views of the correction functions shown in FIGS. 4A to 4E.

Furthermore, the calculation of the correction gain by the hue correction gain calculation equation P(T) of the equation (9) will be described. For p1×M012 as a first term of the equation (9), as shown in FIG. 5A, the hue in the correction region shifts toward the isochromatic line L0 (or in the reverse direction). This is apparent from the characteristic of the second correction function M012. At this time, chromaticity points of the pixels in the angle regions held between the isochromatic lines L0 and L1 and between the isochromatic lines L0 and L2 are substantially rotated/moved in opposite directions with respect to each other.

Figure 5B:
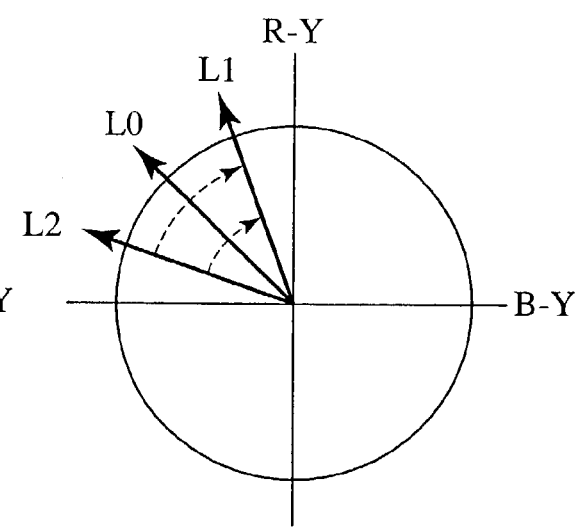

Moreover, for a second term p2×M12 of the equation (9), as shown in FIG. 5B, the hue in the correction region shifts in one direction. As apparent from the characteristic of the first correction function M12, a shift amount becomes larger closer to the isochromatic line L0. At this time, the chromaticity points of the pixels in the angle regions held between the isochromatic lines L0 and L1 and between the isochromatic lines L0 and L2 are substantially rotated/moved in the same direction with respect to each other.

The correction of the hue by the equation (9) is performed only in the correction region surrounded by the angles θ1 to θ2, and influence of the correction is not exerted outside the correction region.

The present embodiment is constituted such that the first and second correction functions M12, M012 are generated and the hue correction gain P is generated by the correction gain calculation equation P(T) of the equation (9). When two functions of FIG. 5B are disposed adjacent to each other on the color difference plane and the phases are allowed to shift in the opposite directions with respect to each other, the function is equivalent to that of FIG. 5A. Therefore, without generating the second correction function M012, the correction gain calculation equation equivalent to the equation (9) can be obtained only with the first correction function M12. In this constitution, it is unnecessary to generate the second correction function M012.

As shown in the above equations (10) to (12), in the correction gain calculation equations S(T), Gy(T), Gc(T) for calculating the correction gains of chroma, Y gamma, and C gamma, the first correction function M12 is used. The correction of the chroma, Y gamma, C gamma by the equations (10) to (12) is performed only in the correction region surrounded with the angles θ1 to θ2, and the influence of correction is not exerted outside the correction region.

In FIG. 1, outputs of the correction gain calculation units 51 to 5n, namely, correction gains of hue, chroma, Y gamma, C gamma generated by the correction gain calculation equations P(T) to Gc(T) represented by the above equations (9) to (12) are denoted by Pi, Si, Gyi, Gci (i=1 to n). It is to be noted that FIG. 1 shows Pi, Si, Gyi, Gci simply as P, S, Gy, Gc. The correction gains Si, Pi, Gyi, Gci outputted from the correction gain calculation units 51 to 5n are accumulated (summed) by accumulators 6 to 9. The outputs of the accumulators 6 to 9 are denoted by ΣSi, ΣPi, ΣGyi, ΣGci.

When the chromaticity point of the inputted pixel is included in any correction region, by subsequent-stage calculation processing, the color difference signals R-Y, B-Y and luminance signal Y are subjected to the correction using the correction gains Si, Pi, Gyi, Gci. In the present embodiment, even when there are a plurality of correction gain calculation units, that is, even when a plurality of correction regions are set on the color difference plane, the correction gains Si, Pi, Gyi, Gci are accumulated/summed, and therefore the circuit constitution of the correction calculation processing in the subsequent stage is simplified with respect to the color difference signals R-Y, B-Y and luminance signal Y. When the chromaticity point of the inputted pixel is included in a plurality of correction regions, the correction gain is a sum. When the chromaticity point of the inputted pixel is not included in any correction region, the correction gain turns to 0.

The color difference signal R-Y inputted into the input terminal 1 is inputted into a multiplier 10, adder 13, and inverter 14, and the color difference signal B-Y inputted into the input terminal 2 is inputted into multipliers 11, 15 and adder 18. The output of the inverter 14 is inputted into a multiplier 16. The correction gain ΣSi outputted from the accumulator 6 is inputted into the multipliers 10, 15. The multiplier 10 multiplies the color difference signal R-Y by the correction gain ΣSi and outputs a result, and the multiplier 15 multiplies the color difference signal B-Y by the correction gain ΣSi and outputs a result. The correction gain ΣPi outputted from the accumulator 7 is inputted into the multipliers 11, 16. The multiplier 11 multiplies the color difference signal B-Y by the correction gain ΣPi and outputs a result, and the multiplier 16 multiplies the color difference signal R-Y reversed by the inverter 14 by the correction gain ΣPi and outputs a result.

An adder 12 adds the outputs of the multipliers 10, 11, and the adder 13 adds the color difference signal R-Y and the output of the adder 12. The output of the adder 13 is the color difference signal R-Y after the correction. An adder 17 adds the outputs of the multipliers 15, 16, and the adder 18 adds the color difference signal B-Y and the output of the adder 17. The output of the adder 18 is the color difference signal B-Y after the correction.

It is seen that the above-described multipliers 10, 11 and adders 12, 13 calculate/process the following equation (13), and the multipliers 15, 16, inverter 14, and adders 17, 18 calculate/process the following equation (14). The color difference signal R-Y corrected by the equation (13) is obtained, and the color difference signal B-Y corrected by the equation (14) is obtained.

$$\Sigma Pi \times (B-Y) + \Sigma Si \times (R-Y) + (R-Y) \tag{13}$$

$$-\Sigma Pi \times (R-Y) + \Sigma Si \times (B-Y) + (B-Y) \tag{14}$$

As described with reference to FIG. 3, the chromaticity point of the inputted pixel is represented by (B-Y), (R-Y). When the chromaticity point is considered as a vector from an origin of the color difference plane of FIG. 3, a vector crossing at right angles to the vector is −(R-Y), (B-Y). Therefore, it is seen that the first terms −ΣPi×(R-Y), ΣPi×(B-Y) of the equations (14) and (13) represent hue correction components in a direction crossing at right angles to the vector of the chromaticity point of the pixel as the object of correction. Moreover, it is seen that the second terms ΣSi× (B-Y), ΣSi×(R-Y) of the equations (14) and (13) represent the correction in the same direction as that of the vector of the chromaticity point of the pixel as the object of correction, that is, chroma correction components.

Therefore, according to the present invention, in the hue correction, each chromaticity point of the pixel in the correction region is moved in a direction crossing at right angles to the isochromatic line connecting the intersection of the R-Y and B-Y axes to the pixel in the correction region. Thereby, the hue substantially rotates/moves in the whole correction region. Moreover, in the chroma correction, each chromaticity point of the pixel in the correction region is moved in a direction extending in parallel with the isochromatic line connecting the intersection of the R-Y and B-Y axes to the pixel in the correction region (a direction in which the chroma is either enlarged or reduced on the isochromatic line).

Therefore, in the present invention, even when the angle region is set to be large as the correction region, it is possible to exactly correct the hue or chroma as intended.

As described above, a first circuit block of the multipliers 10, 11 and adders 12, 13 and second circuit block of the multipliers 15, 16, inverter 14, and adders 17, 18 calculate the color difference signals R-Y, B-Y and correction gains ΣPi, ΣSi to thereby generate the color difference signals R-Y, B-Y subjected to the hue and chroma correction. These first and second circuit blocks operate as correction means for correcting the hue and chroma. The color difference signals R-Y, B-Y outputted from the adders 13, 18 and subjected to the hue and chroma correction are inputted into the luminance/color difference gamma processing unit 19.

Additionally, in the correction of the color difference signals R-Y, B-Y by the above-described equations (13), (14), as described above, the chromaticity point is moved in the direction crossing at right angles to each isochromatic line connecting the intersection of the R-Y and B-Y axes to each pixel in the correction region. When the correction amount (movement amount) is small, the pixel in the correction region can be regarded as moving substantially in the rotation direction. However, when the correction amount is large, the pixel in the correction region cannot be regarded as moving in the rotation direction. When the pixel largely moves in the direction crossing at right angles to the isochromatic line, the chroma also changes.

For this reason, when the correction amount is enlarged, the chromaticity point of each pixel in the correction region is preferably moved in the rotation direction on the color difference plane. Equations for moving the chromaticity point of the pixel in the rotation direction on the color difference plane can be represented by the following equations (15), (16). The color difference signal R-Y corrected by the equation (15) is obtained, and the color difference signal B-Y corrected by the equation (16) is obtained.

$$(1+\Sigma Si) \times \sin(\Sigma Pi) \times (B\text{-}Y) + (1+\Sigma Si) \times \cos(\Sigma Pi) \times (R\text{-}Y) \quad (15)$$

$$(1+\Sigma Si) \times \cos(\Sigma Pi) \times (B\text{-}Y) - (1+\Sigma Si) \times \sin(\Sigma Pi) \times (R\text{-}Y) \quad (16)$$

The equations (15), (16) may also be used as such, but sine and cosine functions in the equations (15), (16) may also be approximated as in the following equations (17), (18). According to the equations (17), (18), $\Sigma Pi$ is remarkably satisfactorily approximated in a range up to $\pi/2$ radian, and the approximation can be said to be practically sufficient.

$$\sin(\Sigma Pi) = \Sigma Pi - (\Sigma Pi)^3/6.6 \quad (17)$$

$$\cos(\Sigma Pi) = 1 - (\Sigma Pi)^2/2.2 \quad (18)$$

When the chromaticity point of the pixel in the correction region is moved in the rotation direction on the color difference plane, the portions of the first circuit block of the multipliers 10, 11 and adders 12, 13 and the second circuit block of the multipliers 15, 16, inverter 14, and adders 17, 18 may also be replaced with a circuit constitution for realizing the equations (15), (16). Of course, the equations (15), (16) may also be realized by software.

Figure 6:
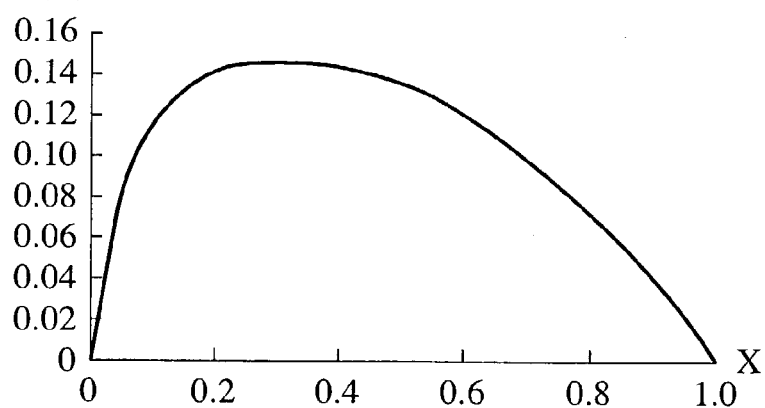
FIG. 6 is an explanatory view of the correction function for use in a luminance/color difference gamma processing unit 19 in FIG. 1.

In FIG. 1, the luminance signal Y inputted into the input terminal 3, and correction gains $\Sigma Gyi$, $\Sigma Gci$ outputted from the accumulators 8, 9 are inputted into the luminance/color difference gamma processing unit 19 as described above. As shown in FIG. 6, the luminance/color difference gamma processing unit 19 includes the correction function represented by the following equation (19).

$$G(X) = X^{1/1.5} - X \quad (19)$$

The luminance/color difference gamma processing unit 19 subjects the luminance signal Y and color difference signals R-Y, B-Y to gamma correction, and X (the abscissa of FIG. 6) in the equation (19) indicates the values of the luminance signal Y and color difference signals R-Y, B-Y. When the video signal is subjected to the gamma correction, optimum characteristic depends upon each display device. The equation (19) is one example, and the correction characteristic in the luminance/color difference gamma processing unit 19 is not limited to the equation (19).

The luminance/color difference gamma processing unit 19 multiplies the correction gain $\Sigma Gyi$ by the correction function $G(X)$, and adds this multiplication result to the luminance signal Y. That is, the calculation processing of the following equation (20) is performed.

$$Y + G(X) \times Gyi \quad (20)$$

It is seen that the correction gain $\Sigma Gyi$ is a coefficient for setting the amplitude of the correction function $G(X)$ shown in FIG. 6 to be variable.

When luminance changes by the gamma correction of the luminance signal Y, the chroma also changes, and it becomes necessary to correct the chroma. Thus, the luminance/color difference gamma processing unit 19 gamma-corrects the inputted color difference signals R-Y, B-Y. The luminance/color difference gamma processing unit 19 multiplies each of the color difference signals R-Y, B-Y by the correction gain $\Sigma Gci$ and correction functions $G(X)$ and $1/X$, and adds the multiplication result to the color difference signals R-Y, B-Y. That is, the calculation processing of the following equations (21), (22) is performed.

$$(R\text{-}Y) + (R\text{-}Y) \times G(X) \times \Sigma Gci/X \quad (21)$$

$$(B\text{-}Y) + (B\text{-}Y) \times G(X) \times \Sigma Gci/X \quad (22)$$

In the equations (21), (22), $(R\text{-}Y) \times G(X) \times \Sigma Gci$, and $(B\text{-}Y) \times G(X) \times \Sigma Gci$ are divided by X in order to match an increase/decrease ratio of chroma with that of luminance. When X indicates a small value such as 0.1 or less, the operation becomes unstable. Also, there is a possibility that S/N is deteriorated in low luminance. Therefore, to improve the stability of operation and S/N in the low luminance, it is preferable to limit a minimum value of X to 0.1. The correction (C gamma) of the chroma can be performed in accordance with the gamma processing of the luminance signal in this manner.

The luminance signal Y subjected to Y gamma outputted from the luminance/color difference gamma processing unit 19 is outputted from an output terminal 22, and the color difference signals R-Y, B-Y subjected to the C gamma are outputted from output terminals 20, 21. When the luminance signal Y and color difference signals R-Y, B-Y need to be returned to three primary colors signals, the signals may be converted to the three primary colors signals by linear matrix computation.

According to the above-described constitution, the hue and chroma of the color difference signals R-Y, B-Y and luminance signal Y inputted into the input terminals 1 to 3 can be corrected only in the predetermined correction region. Furthermore, in addition to the correction, Y gamma and C gamma can be applied. In the present embodiment, the correction of all the hue, chroma, Y gamma, and C gamma has been described. However, only one arbitrary element of these elements may be corrected, or an arbitrary combination may also be corrected. Additionally, it is preferable to apply the Y and C gammas as a set.

In the above-described present embodiment, the correction of the hue and chroma by the first circuit block including the multipliers 10, 11 and adders 12, 13 and the second circuit block including the multipliers 15, 16, inverter 14, and adders 17, 18 has no relation to the value of the luminance signal Y. The correction amount of the hue or chroma may be allowed to differ in accordance with the value of the luminance signal Y. To allow the correction amount of the hue or chroma to differ in accordance with the value of the luminance signal Y, the coefficients p1, p2, s1 inputted into the correction gain calculation units 51 to 5n may be changed in accordance with the value of the luminance signal Y.

Figure 7:
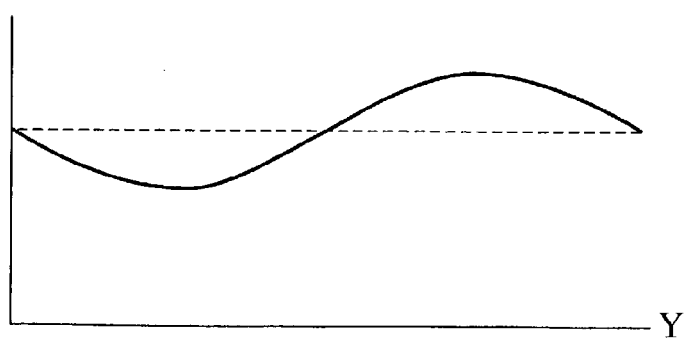
FIG. 7 is a diagram showing a conversion characteristic example in which a coefficient of a chroma correction gain is variable in accordance with a luminance signal.
Figure 8:
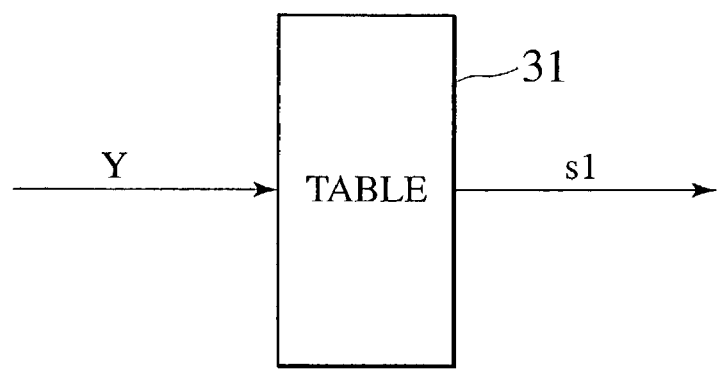
FIG. 8 is a block diagram showing one example of means for setting the coefficient of the chroma correction gain in accordance with the luminance signal.

One example of the characteristic in changing the coefficient si in accordance with the value of the luminance signal Y and varying the correction amount of chroma is shown in FIG. 7. The abscissa indicates the luminance signal Y, and the ordinate indicates the coefficient s1. In the characteristic, the chroma is lowered at a low luminance, and raised at a high luminance. As means for changing the coefficient s1, as one example, a table shown in FIG. 8 can be used. In FIG. 8, the coefficient s1 having various values is stored in a table 31. In the table 31, the value of the luminance signal Y is inputted as an address, and the coefficient s1 is outputted from the table 31 in accordance with the value of the inputted luminance signal Y. The same also applies to a case in which the coefficients p1, p2 are changed in accordance with the value of the luminance signal Y.

Figure 9:
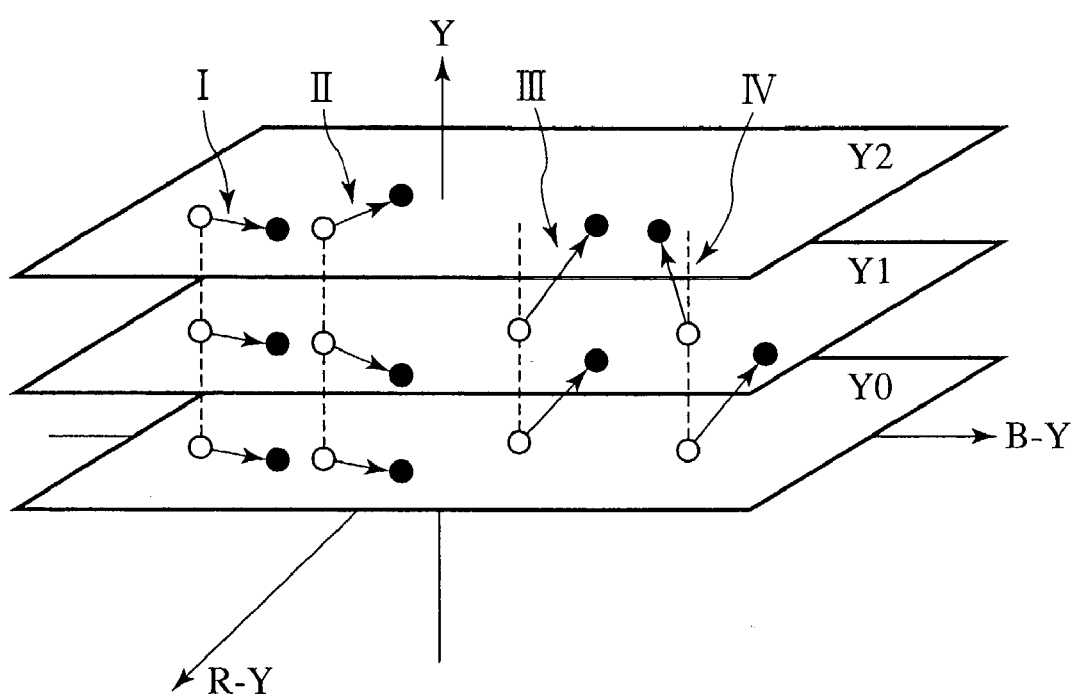
FIG. 9 is a diagram schematically showing a function in a case in which the coefficient of the hue/chroma correction gain is set to be variable in accordance with the luminance signal.

When the hue or chroma is changed in accordance with the value of the luminance signal Y in this manner, the video in the correction region is three-dimensionally corrected as shown in FIG. 9. In FIG. 9, a Y-axis indicating the value of the luminance signal Y crosses at right angles to a color difference plane formed by the R-Y and B-Y axes. In FIG. 9, each of Y0, Y1, Y2 denotes equal luminance plane. In FIG. 9, I conceptually shows the correction of the hue and chroma of the pixel shown by a white circle into a position shown by a black circle irrelevantly to the value of the luminance signal Y. In FIG. 9, II conceptually shows the correction of the hue and chroma of the pixel shown by the white circle into the position shown by the black circle in accordance with the value of the luminance signal Y.

Furthermore, III shown in FIG. 9 conceptually shows the application of Y and C gammas in addition to the correction of I. In FIG. 9, IV conceptually shows the application of the Y and C gammas in addition to the correction of II.

Additionally, in FIG. 1, the constitution of the present invention is shown as hardware, but may of course be realized by software (computer program). In the present invention, the constitution of the present invention may be an integrated circuit, program including steps of the present invention, or recording medium on which the program is recorded. The recording medium may be an arbitrary medium including an optical disk such as CD-ROM, or another disk.

Figure 10:
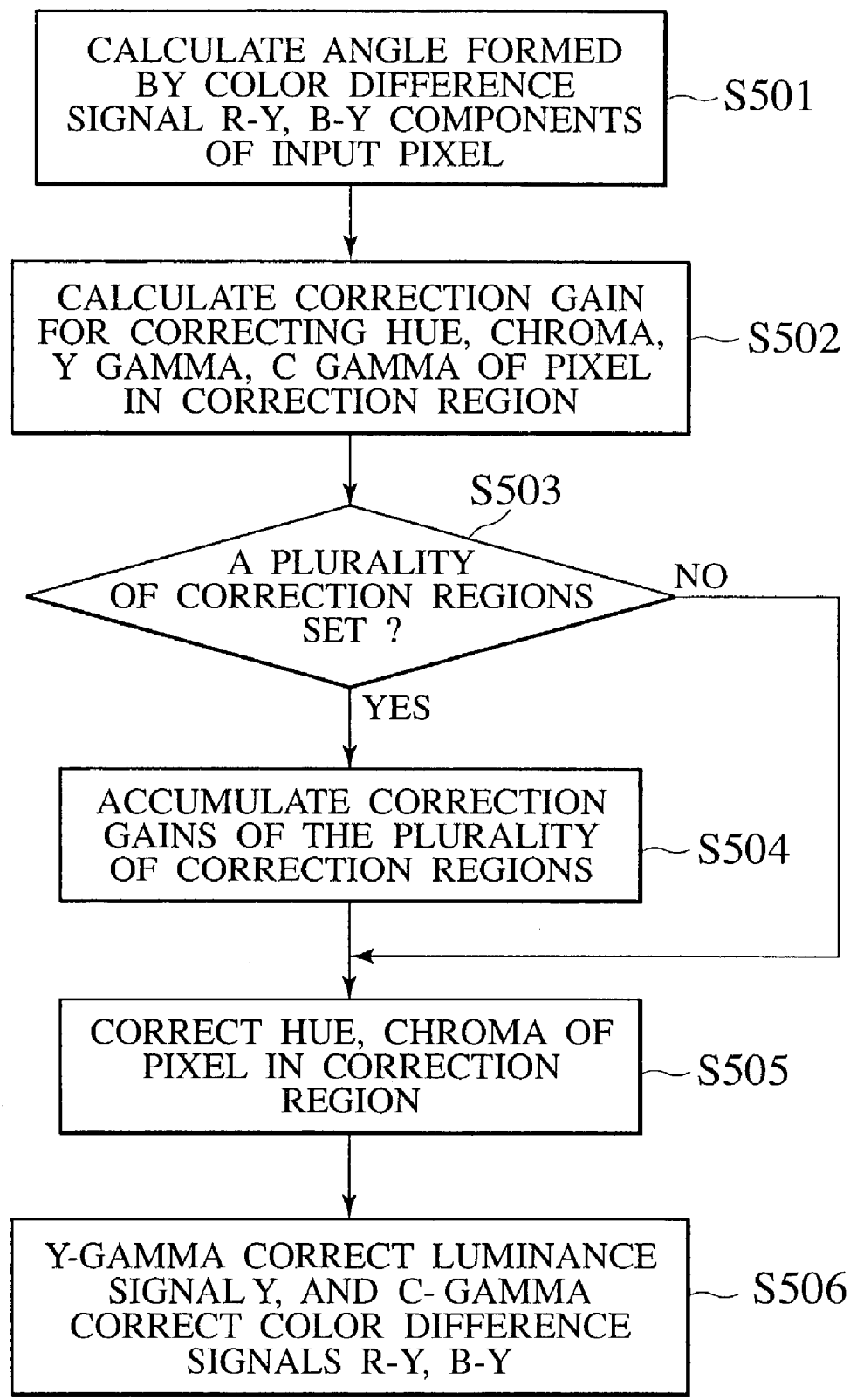
FIG. 10 is a flowchart showing a processing procedure in a case in which a constitution of the present invention is realized in software (computer program).

FIG. 10 is a flowchart showing a processing procedure in a case in which a constitution of the present invention is realized in software (computer program).

That is, as apparent from the above description, the video correction method or program of the present invention includes the following steps. First, as step S501, an angle calculation step of calculating the angle formed by the components of the color difference signals R-Y, B-Y on the color difference plane of each input pixel is included.

As step S502, the method or program includes a correction gain calculation step of: using the angle of each input pixel calculated by the angle calculation step as a parameter to set the correction gain for correcting the hue, chroma, Y gamma, C gamma of the pixel of the video signal outside the correction region to zero, and to calculate the correction gain for correcting the hue, chroma, Y gamma, C gamma of the pixel in the correction region based on the correction gain calculation equation for generating a predetermined correction gain in the correction region.

When a plurality of correction regions are set on the color difference plane (affirmative judgment in step S503), the method or program includes an accumulation step of accumulating the respective correction gains of the plurality of correction regions as step S504. When there is only one correction region, this accumulation step is not necessary. As step S505, a correction step of calculating the color difference signals R-Y, B-Y and the correction gains of hue and chroma, and correcting the hue and chroma of the pixel in the correction region is included.

Furthermore, as step S506, the method or program includes a step of: adding the value obtained by multiplying the correction gain of Y gamma by a predetermined correction function to the luminance signal Y to correct (Y gamma correction) the luminance signal Y; adding the value obtained by multiplying each of the color difference signals R-Y, B-Y by the correction gain and correction function of C gamma to each of the color difference signals R-Y, B-Y to correct (C gamma correction) the color difference signals R-Y, B-Y.

It is to be noted that the steps S501 to S504 need to be performed in this order. The steps S505 and S506 may also be performed at the same timing, and either step may temporally come before.

Additionally, the present invention can be used not only for a purpose of correction of dispersions of the chromaticity point or dispersions of video caused by an image pickup apparatus but also for a purpose of intentional correction of a specific color. For example, green color of grasses or trees can be changed to yellow or brown to thereby change sense of the season of video. Since the hue, chroma, or luminance (gradation) of the specific color of video can arbitrary be varied, the present invention can be used in various purposes.

The present invention is not limited to the above-described embodiment, and can variously be changed in a range without departing from the scope of the present invention. In the present embodiment, the color difference signals have been described as R-Y, B-Y, but are not limited to R-Y, B-Y.

As described above in detail, according to the present invention, there are provided the video correction apparatus and method, video correction program, and recording medium on which the program is recorded, comprising: angle calculation means (step) for calculating the angle formed by the first and second color difference signal components on the color difference plane of each input pixel; correction gain calculation means (step) for using the angle of each input pixel calculated by the angle calculation means (step) as the parameter to set the correction gain for correcting the hue or chroma of the pixel of the video signal to zero outside the correction region, and to calculate the correction gain for correcting the hue or chroma of the pixel in the correction region based on the correction gain calculation equation for generating the predetermined correction gain in the correction region; and hue correction means (step) for calculating the first and second color difference signals and correction gain to thereby correct the hue or chroma of the pixel in the correction region. Therefore, even when the correction region is a broad angle region, the hue or chroma can exactly be corrected.

Moreover, in addition to the correction gain of the hue or chroma only in the correction region, the luminance correction gain only in the correction region is calculated, multiplied by the correction function, and added to the luminance signal components, so that the luminance signal can be corrected together with the correction of the hue and chroma. Since the color difference correction gain and correction function only in the correction region are used to correct the color difference signal together with the correction of the luminance signal, the apparently changing chroma can be corrected together with the correction of the luminance signal, and the correction is possible without collapsing a balance of luminance and chroma of video.

Furthermore, when a plurality of angle regions are set as a plurality of correction regions, respective correction gains are calculated for the plurality of correction regions, and the correction gains for the plurality of correction regions are accumulated. In this constitution, even when a large number of correction regions are set, a scale of hardware or software is not remarkably enlarged. Therefore, according to the present invention, even when a large number of correction regions are set, the constitution can easily and inexpensively be realized. Since each of the hue, chroma, and luminance of video can arbitrarily be corrected to be optimum, the present invention is remarkably effectively used in displays such as a television receiving set.

It should be understood that many modifications and adaptations of the invention will become apparent to those skilled in the art and it is intended to encompass such obvious modifications and changes in the scope of the claims appended hereto.

What is claimed is:

1. A video correction apparatus for setting one or a plurality of angle regions on a color difference plane formed by first and second axes as correction regions, and correcting video in the correction regions, when one of first and second color difference signals which are color signal components of a pixel of a video signal is used as the first axis, and the other of the first and second color difference signals is used as the second axis crossing at right angles to the first axis, the apparatus comprising:

angle calculation unit configured to calculate an angle formed by components of the first and second color difference signals of each input pixel on the color difference plane;

a hue correction gain calculation unit configured to use the angle of each input pixel calculated by the angle calculation unit as a parameter to set a hue correction gain for correcting hue of the pixel of the video signal to zero outside the correction regions and to calculate the hue correction gain for correcting the hue of the pixel in each correction region based on a hue correction gain calculation equation for generating a predetermined hue correction gain for each correction region; and a hue correction unit configured to correct the hue of the pixel in each correction region by a calculation using the first and second color difference signals and the hue correction gain;

a luminance correction gain calculation unit configured to use the angle of each input pixel calculated by the angle calculation unit as the parameter thereby to set a luminance correction gain for correcting luminance of the pixel of the video signal to zero outside the correction regions and calculate the luminance correction gain for correcting the luminance of the pixel in each correction region based on a luminance correction gain calculation equation for generating a predetermined luminance correction gain for each correction region; and a luminance correction unit configured to multiply a first correction function for correcting a luminance signal component of the pixel of the video signal by the luminance correction gain, and add the multiplication result to the luminance signal component to correct the luminance of the pixel of the video signal.

2. The video correction apparatus according to claim 1, further comprising:

a first chroma correction gain calculation unit configured to use the angle of each input pixel calculated by the angle calculation unit as the parameter thereby to set a chroma correction gain for correcting chroma of the pixel of the video signal to zero outside the correction regions and calculate a first chroma correction gain for correcting the chroma of the pixel in each correction region based on a first chroma correction gain calculation equation for generating a predetermined chroma correction gain for each correction region; and a first chroma correction unit configured to correct the chroma of the pixel in each correction region by a calculation using the first and second color difference signals and the first chroma correction gain.

3. The video correction apparatus according to claim 1, further comprising:

a second chroma correction gain calculation unit configured to use the angle of each input pixel calculated by the angle calculation unit as the parameter thereby to set a chroma correction gain for correcting chroma of the pixel of the video signal to zero outside the correction regions and calculate a second chroma correction gain for correcting the chroma of the pixel in each correction region based on a second chroma correction gain calculation equation for generating a predetermined chroma correction gain for each correction region; and a second chroma correction unit configured to multiply each of the first and second color difference signals by the second chroma correction gain and first correction function, and add each multiplication result to the respective first and second color difference signals to correct the chroma of the pixel in each correction region.

4. The video correction apparatus according to claim 1, wherein the hue correction unit moves a chromaticity point of each pixel in each correction region in a direction crossing at right angles to each isochromatic line connecting an intersection of the first and second axes to each pixel in each correction region.

5. The video correction apparatus according to claim 1, wherein the hue correction unit moves a chromaticity point of each pixel in each correction region in a rotation direction on the color difference plane.

6. The video correction apparatus according to claim 2, wherein the first chroma correction unit moves a chromaticity point of each pixel in each correction region in a direction extending in parallel with each isochromatic line connecting an intersection of the first and second axes to each pixel in each correction region.

7. A video correction apparatus for setting one or a plurality of angle regions on a color difference plane formed by first and second axes as correction regions, and correcting video in the correction regions, when one of first and second color difference signals which are color signal components of a pixel of a video signal is used as the first axis, and the other of the first and second color difference signals is used as the second axis crossing at right angles to the first axis, the apparatus comprising:

angle calculation unit configured to calculate an angle formed by components of the first and second color difference signals of each input pixel on the color difference plane;

a hue correction gain calculation unit configured to use the angle of each input pixel calculated by the angle calculation unit as a parameter to set a hue correction gain for correcting hue of the pixel of the video signal to zero outside the correction regions and to calculate the hue correction gain for correcting the hue of the pixel in each correction region based on a hue correction gain calculation equation for generating a predetermined hue correction gain for each correction region; and a hue correction unit configured to correct the hue of the pixel in each correction region by a calculation using the first and second color difference signals and the hue correction gain;

wherein the hue correction gain calculation equation includes a second correction function for moving the chromaticity points of the pixels in second and third angle regions in opposite directions with respect to each other, and a third correction function for moving the chromaticity points of the pixels in the second and third angle regions in the same direction with respect to each other, when each correction region is set as a first angle region surrounded with first and second isochromatic lines and the first angle region is divided into two by a third isochromatic line as a center line of the first angle region to form the second and third angle regions.

8. The video correction apparatus according to claim 1, wherein the first correction function is a function having a characteristic that luminance or chroma of the pixel of the video signal is subjected to gamma correction.

9. A video correction apparatus for setting a plurality of angle regions on a color difference plane formed by first and second axes as a plurality of correction regions, and correcting video in the correction regions, when one of first and second color difference signals which are color signal components of a pixel of a video signal is used as the first axis, and the other of the first and second color difference signals is used as the second axis crossing at right angles to the first axis, the apparatus comprising:

an angle calculation unit configured to calculate an angle formed by components of the first and second color difference signals of each input pixel on the color difference plane;

a plurality of hue correction gain calculation units configured to use the angle of each input pixel calculated by the angle calculation unit as a parameter thereby to set a hue correction gain for correcting hue of the pixel of the video signal to zero outside the correction regions and calculate the hue correction gain for correcting the hue-of the pixel in each correction region with respect to the plurality of correction regions based on a hue correction gain calculation equation for generating a predetermined hue correction gain for each correction region;

a first accumulation unit configured to accumulate the hue correction gains for the plurality of correction regions calculated by the plurality of hue correction gain calculation units; and a hue correction unit configured to correct the hue of the pixel in each correction region by a calculation using the first and second color difference signals and the hue correction gains accumulated by the first accumulation unit.

10. The video correction apparatus according to claim 9, further comprising:

a plurality of first chroma correction gain calculation units configured to use the angle of each input pixel calculated by the angle calculation unit as the parameter thereby to set a chroma correction gain for correcting chroma of the pixel of the video signal to zero outside the correction regions and calculate a first chroma correction gain for correcting the chroma of the pixel in each correction region with respect to the plurality of correction regions based on a first chroma correction gain calculation equation for generating a predetermined chroma correction gain for each correction region;

a second accumulation unit configured to accumulate the first chroma correction gains for the plurality of correction regions calculated by the plurality of first chroma correction gain calculation units; and a first chroma correction unit configured to correct the chroma of the pixel in each correction region by a calculation using the first and second color difference signals and first chroma correction gains accumulated by the second accumulation unit.

11. The video correction apparatus according to claim 9, further comprising:

a plurality of luminance correction gain calculation unit configured to use the angle of each input pixel calculated by the angle calculation unit as the parameter thereby to set a luminance correction gain for correcting luminance of the pixel of the video signal to zero outside the correction regions and calculate the luminance correction gain for correcting the luminance of the pixel in each correction region with respect to the plurality of correction regions based on a luminance correction gain calculation equation for generating a predetermined luminance correction gain for each correction region;

a third accumulation unit configured to accumulate the luminance correction gains for the plurality of correction regions calculated by the plurality of luminance correction gain calculation units; and a luminance correction unit configured to multiply a first correction function for correcting a luminance signal component of the pixel of the video signal by the luminance correction gains accumulated by the third accumulation unit, and add the multiplication result to the luminance signal component to correct the luminance of the pixel of the video signal.

12. The video correction apparatus according to claim 10, further comprising:

a plurality of luminance correction gain calculation units configured to use the angle of each input pixel calculated by the angle calculation unit as the parameter thereby to set a luminance correction gain for correcting luminance of the pixel of the video signal to zero outside the correction regions and calculate the luminance correction gain for correcting the luminance of the pixel in each correction region with respect to the plurality of correction regions based on a luminance correction gain calculation equation for generating a predetermined luminance correction gain for each correction region;

a third accumulation unit configured to accumulate the luminance correction gains for the plurality of correction regions calculated by the plurality of luminance correction gain calculation unit; and a luminance correction unit configured to multiply a first correction function for correcting a luminance signal component of the pixel of the video signal by the luminance correction gains accumulated by the third accumulation unit, and add the multiplication result to the luminance signal component to correct the luminance of the pixel of the video signal.

13. The video correction apparatus according to claim 11, further comprising:

a plurality of second chroma correction gain calculation units configured to use the angle of each input pixel calculated by the angle calculation unit as the parameter thereby to set a chroma correction gain for correcting chroma of the pixel of the video signal to zero outside the correction regions and calculate a second chroma correction gain for correcting the chroma of the pixel in each correction region with respect to the plurality of correction regions based on a second chroma correction gain calculation equation for generating a predetermined chroma correction gain for each correction region;

a fourth accumulation unit configured to accumulate the second chroma correction gains for the plurality of correction regions calculated by the plurality of second chroma correction gain calculation units; and a second chroma correction unit configured to multiply each of the first and second color difference signals by the second chroma correction gains accumulated by the fourth accumulation unit and the first correction function, and add each multiplication result to the respective first and second color difference signals to correct the chroma of the pixel in each correction region.

14. The video correction apparatus according to claim 12, further comprising:

a plurality of second chroma correction gain calculation unit configured to use the angle of each input pixel calculated by the angle calculation unit as the parameter thereby to set a chroma correction gain for correcting chroma of the pixel of the video signal to zero outside the correction regions and calculate a second chroma correction gain for correcting the chroma of the pixel in each correction region with respect to the plurality of correction regions based on a second chroma correction gain calculation equation for generating a predetermined chroma correction gain for each correction region;

a fourth accumulation unit configured to accumulate the second chroma correction gains for the plurality of correction regions calculated by the plurality of second chroma correction gain calculation units; and a second chroma correction unit configured to multiply each of the first and second color difference signals by the second chroma correction gains accumulated by the fourth accumulation unit and the first correction function, and add each multiplication result to the respective first and second color difference signals to correct the chroma of the pixel in each correction region.

15. The video correction apparatus according to claim 9, wherein the hue correction unit moves a chromaticity point of each pixel in each correction region in a direction crossing at right angles to each isochromatic line connecting an intersection of the first and second axes to each pixel in each correction region.

16. The video correction apparatus according to claim 9, wherein the hue correction unit moves a chromaticity point of each pixel in each correction region in a rotation direction on the color difference plane.

17. The video correction apparatus according to claim 10, wherein the first chroma correction unit moves a chromaticity point of each pixel in each correction region in a direction extending in parallel with each isochromatic line connecting an intersection of the first and second axes to each pixel in each correction region.

18. The video correction apparatus according to claim 9, wherein the hue correction gain calculation equation includes a second correction function for moving the chromaticity points of the pixels in second and third angle regions in opposite directions with respect to each other, and a third correction function for moving the chromaticity points of the pixels in the second and third angle regions in the same direction with respect to each other, when each correction region is set as a first angle region surrounded with first and second isochromatic lines and the first angle region is divided into two by a third isochromatic line as a center line of the first angle region to form the second and third angle regions.

19. The video correction apparatus according to claim 11, wherein the first correction function is a function having a characteristic that luminance or chroma of the pixel of the video signal is subjected to gamma correction.

20. The video correction apparatus according to claim 12, wherein the first correction function is a function having a characteristic that luminance or chroma of the pixel of the video signal is subjected to gamma correction.

21. A video correction method for setting one or a plurality of angle regions on a color difference plane formed by first and second axes as correction regions, and correcting video in the correction regions, when one of first and second color difference signals which are color signal components of a pixel of a video signal is used as the first axis, and the other of the first and second color difference signals is used as the second axis crossing at right angles to the first axis, the method comprising:

an angle calculation step of calculating an angle formed by components of the first and second color difference signals of each input pixel on the color difference plane;

a hue correction gain calculation step of using the angle of each input pixel calculated in the angle calculation step as a parameter to set a hue correction gain for correcting hue of the pixel of the video signal to zero outside the correction regions and to calculate the hue correction gain for correcting the hue of the pixel in each correction region based on a hue correction gain calculation equation for generating a predetermined hue correction gain for each correction region; and a hue correction step of correcting the hue of the pixel in each correction region by a calculation using the first and second color difference signals and hue correction gain;

a luminance correction gain calculation step of using the angle of each input pixel calculated by the angle calculation step as the parameter to set a luminance correction gain for correcting luminance of the pixel of the video signal to zero outside the correction regions and to calculate the luminance correction gain for correcting the luminance of the pixel in each correction region based on a luminance correction gain calculation equation for generating a predetermined luminance correction gain for each correction region; and a luminance correction step of multiplying a first correction function for correcting a luminance signal component of the pixel of the video signal by the luminance correction gain, and adding the multiplication result to the luminance signal component to correct the luminance of the pixel of the video signal.

22. The video correction method according to claim 21, further comprising:

a first chroma correction gain calculation step of using the angle of each input pixel calculated by the angle calculation step as the parameter to set a chroma correction gain for correcting chroma of the pixel of the video signal to zero outside the correction regions and to calculate a first chroma correction gain for correcting the chroma of the pixel in each correction region based on a first chroma correction gain calculation equation for generating a predetermined chroma correction gain for each correction region; and a first chroma correction step of correcting the chroma of the pixel in each correction region by a calculation using the first and second color difference signals and first chroma correction gain.

23. The video correction method according to claim 21, further comprising: a second chroma correction gain calculation step of using the angle of each input pixel calculated by the angle calculation step as the parameter to set a chroma correction gain for correcting chroma of the pixel of the video signal to zero outside the correction regions and to calculate a second chroma correction gain for correcting the chroma of the pixel in each correction region based on a second chroma correction gain calculation equation for generating a predetermined chroma correction gain for each correction region; and a second chroma correction step of multiplying each of the first and second color difference signals by the second chroma correction gain and first correction function, and adding each multiplication result to the respective first and second color difference signals to correct the chroma of the pixel in each correction region.

24. The video correction method according to claim 21, wherein the hue correction step comprises: moving a chromaticity point of each pixel in each correction region in a direction crossing at right angles to each isochromatic line connecting an intersection of the first and second axes to each pixel in each correction region.

25. The video correction method according to claim 21, wherein the hue correction step comprises: moving a chromaticity point of each pixel in each correction region in a rotation direction on the color difference plane.

26. The video correction method according to claim 22, wherein the first chroma correction step comprises: moving a chromaticity point of each pixel in each correction region in a direction extending in parallel with each isochromatic line connecting an intersection of the first and second axes to each pixel in each correction region.

27. A video correction method for setting one or a plurality of angle regions on a color difference plane formed by first and second axes as correction regions, and correcting video in the correction regions, when one of first and second color difference signals which are color signal components of a pixel of a video signal is used as the first axis, and the other of the first and second color difference signals is used as the second axis crossing at right angles to the first axis, the method comprising:

an angle calculation step of calculating an angle formed by components of the first and second color difference signals of each input pixel on the color difference plane;

a hue correction gain calculation step of using the angle of each input pixel calculated in the angle calculation step as a parameter to set a hue correction gain for correcting hue of the pixel of the video signal to zero outside the correction regions and to calculate the hue correction gain for correcting the hue of the pixel in each correction region based on a hue correction gain calculation equation for generating a predetermined hue correction gain for each correction region; and a hue correction step of correcting the hue of the pixel in each correction region by a calculation using the first and second color difference signals and hue correction gain;

wherein the hue correction gain calculation equation includes a second correction function for moving the chromaticity points of the pixels in second and third angle regions in opposite directions with respect to each other, and a third correction function for moving the chromaticity points of the pixels in the second and third angle regions in the same direction with respect to each other, when the correction region is set as a first angle region surrounded with first and second isochromatic lines and the first angle region is divided into two by a third isochromatic line as a center line of the first angle region to form the second and third angle regions.

28. The video correction method according to claim 21, wherein the first correction function is a function having a characteristic that luminance or chroma of the pixel of the video signal is subjected to gamma correction.

29. A video correction method for setting a plurality of angle regions on a color difference plane formed by first and second axes as a plurality of correction regions, and correcting video in the correction regions, when one of first and second color difference signals which are color signal components of a pixel of a video signal is used as the first axis, and the other of the first and second color difference signals is used as the second axis crossing at right angles to the first axis, the method comprising:

an angle calculation step of calculating an angle formed by components of the first and second color difference signals of each input pixel on the color difference plane;

a plurality of hue correction gain calculation steps of using the angle of each input pixel calculated in the angle calculation step as a parameter to set a hue correction gain for correcting hue of the pixel of the video signal to zero outside the correction regions and to calculate the hue correction gain for correcting the hue of the pixel in each correction region with respect to the plurality of correction regions based on a hue correction gain calculation equation for generating a predetermined hue correction gain for each correction region;

a first accumulation step of accumulating the hue correction gains for the plurality of correction regions calculated in the plurality of hue correction gain calculation steps; and a hue correction step of correcting the hue of the pixel in each correction region by a calculation using the first and second color difference signals and the hue correction gains accumulated by the first accumulation step.

30. The video correction method according to claim 29, further comprising:

a plurality of first chroma correction gain calculation steps of using the angle of each input pixel calculated in the angle calculation step as the parameter to set a chroma correction gain for correcting chroma of the pixel of the video signal to zero outside the correction regions and to calculate a first chroma correction gain for correcting the chroma of the pixel in each correction region with respect to the plurality of correction regions based on a first chroma correction gain calculation equation for generating a predetermined chroma correction gain for each correction region;

a second accumulation step of accumulating the first chroma correction gains for the plurality of correction regions calculated in the plurality of first chroma correction gain calculation steps; and a first chroma correction step of correcting the chroma of the pixel in each correction region by a calculation using the first and second color difference signals and first chroma correction gains accumulated by the second accumulation step.

31. The video correction method according to claim 29, further comprising:

a plurality of luminance correction gain calculation steps
of using the angle of each input pixel calculated in the
angle calculation step as the parameter to set a lumi-
nance correction gain for correcting luminance of the
pixel of the video signal to zero outside the correction
regions and to calculate the luminance correction gain
for correcting the luminance of the pixel in each
correction region with respect to the plurality of cor-
rection regions based on a luminance correction gain
calculation equation for generating a predetermined
luminance correction gain for each correction region;
a third accumulation step of accumulating the luminance
correction gains for the plurality of correction regions
calculated by the plurality of luminance correction gain
calculation steps; and
a luminance correction step of multiplying a first correc-
tion function for correcting a luminance signal com-
ponent of the pixel of the video signal by the luminance
correction gains accumulated by the third accumulation
step, and adding the multiplication result to the lumi-
nance signal component to correct the luminance of the
pixel of the video signal.

32. The video correction method according to claim 30, further comprising:
a plurality of luminance correction gain calculation steps
of using the angle of each input pixel calculated in the
angle calculation step as the parameter to set a lumi-
nance correction gain for correcting luminance of the
pixel of the video signal to zero outside the correction
regions and to calculate the luminance correction gain
for correcting the luminance of the pixel in each
correction region with respect to the plurality of cor-
rection regions based on a luminance correction gain
calculation equation for generating a predetermined
luminance correction gain for each correction region;
a third accumulation step of accumulating the luminance
correction gains for the plurality of correction regions
calculated by the plurality of luminance correction gain
calculation steps; and
a luminance correction step of multiplying a first correc-
tion function for correcting a luminance signal com-
ponent of the pixel of the video signal by the luminance
correction gains accumulated by the third accumulation
step, and adding the multiplication result to the lumi-
nance signal component to correct the luminance of the
pixel of the video signal.

33. The video correction method according to claim 31, further comprising:
a plurality of second chroma correction gain calculation
steps of using the angle of each input pixel calculated
in the angle calculation step as the parameter to set a
chroma correction gain for correcting chroma of the
pixel of the video signal to zero outside the correction
regions and to calculate a second chroma correction
gain for correcting the chroma of the pixel in each
correction region with respect to the plurality of cor-
rection regions based on a second chroma correction
gain calculation equation for generating a predeter-
mined chroma correction gain for each correction
region;
a fourth accumulation step of accumulating the second
chroma correction gains of the plurality of correction
regions calculated by the plurality of second chroma
correction gain calculation steps; and
a second chroma correction step of multiplying each of
the first and second color difference signals by the
second chroma correction gains accumulated in the
fourth accumulation step and the first correction func-
tion, and adding each multiplication result to the
respective first and second color difference signals to
correct the chroma of the pixel in each correction
region.

34. The video correction method according to claim 32, further comprising:
a plurality of second chroma correction gain calculation
steps of using the angle of each input pixel calculated
in the angle calculation step as the parameter to set a
chroma correction gain for correcting chroma of the
pixel of the video signal to zero outside the correction
regions and to calculate a second chroma correction
gain for correcting the chroma of the pixel in each
correction region with respect to the plurality of cor-
rection regions based on a second chroma correction
gain calculation equation for generating a predeter-
mined chroma correction gain for each correction
region;
a fourth accumulation step of accumulating the second
chroma correction gains of the plurality of correction
regions calculated by the plurality of second chroma
correction gain calculation steps; and
a second chroma correction step of multiplying each of
the first and second color difference signals by the
second chroma correction gains accumulated in the
fourth accumulation step and the first correction func-
tion, and adding each multiplication result to the
respective, first and second color difference signals to
correct the chroma of the pixel in each correction
region.

35. The video correction method according to claim 29, wherein the hue correction step comprises: moving a chromaticity point of each pixel in each correction region in a direction crossing at right angles to each isochromatic line connecting an intersection of the first and second axes to each pixel in each correction region.

36. The video correction method according to claim 29, wherein the hue correction step comprises: moving a chromaticity point of each pixel in each correction region in a rotation direction on the color difference plane.

37. The video correction method according to claim 30, wherein the first chroma correction step comprises: moving a chromaticity point of each pixel in each correction region in a direction extending in parallel with each isochromatic line connecting an intersection of the first and second axes to each pixel in each correction region.

38. The video correction method according to claim 29, wherein the hue correction gain calculation equation includes a second correction function for moving the chromaticity points of the pixels in second and third angle regions in opposite directions with respect to each other, and a third correction function for moving the chromaticity points of the pixels in the second and third angle regions in the same direction with respect to each other, when the correction region is set as a first angle region surrounded with first and second isochromatic lines and the first angle region is divided into two by a third isochromatic line as a center line of the first angle region to form the second and third angle regions.

39. The video correction method according to claim 31, wherein the first correction function is a function having a characteristic that luminance or chroma of the pixel of the video signal is subjected to gamma correction.

40. The video correction method according to claim 32, wherein the first correction function is a function having a characteristic that luminance or chroma of the pixel of the video signal is subjected to gamma correction.

41. A video correction program stored in a computer readable medium, for causing a computer, when executing the video correction program, to function as a video correction apparatus for setting one or a plurality of angle regions on a color difference plane formed by first and second axes as correction regions, and correcting video in the correction regions, when one of first and second color difference signals which are color signal components of a pixel of a video signal is used as the first axis, and the other of the first and second color difference signals is used as the second axis crossing at right angles to the first axis, the program comprising:
- an angle calculation step of calculating an angle formed by components of the first and second color difference signals of each input pixel on the color difference plane;
- a hue correction gain calculation step of using the angle of each input pixel calculated in the angle calculation step as a parameter to set a hue correction gain for correcting hue of the pixel of the video signal to zero outside the correction regions and to calculate the hue correction gain for correcting the hue of the pixel in each correction region based on a hue correction gain calculation equation for generating a predetermined hue correction gain for each correction region; and
- a hue correction step of correcting the hue of the pixel in each correction region by a calculation using the first and second color difference signals and hue correction gain;
- a luminance correction gain calculation step of using the angle of each input pixel calculated in the angle calculation step as the parameter to set a luminance correction gain for correcting luminance of the pixel of the video signal to zero outside the correction regions and to calculate the luminance correction gain for correcting the luminance of the pixel in each correction region based on a luminance correction gain calculation equation for generating a predetermined luminance correction gain for each correction region; and
- a luminance correction step of multiplying a first correction function for correcting a luminance signal component of the pixel of the video signal by the luminance correction gain, and adding the multiplication result to the luminance signal component to correct the luminance of the pixel of the video signal.

42. The video correction program according to claim 41, further comprising:
- a first chroma correction gain calculation step of using the angle of each input pixel calculated in the angle calculation step as the parameter to set a chroma correction gain for correcting chroma of the pixel of the video signal to zero outside the correction regions and to calculate a first chroma correction gain for correcting the chroma of the pixel in each correction region based on a first chroma correction gain calculation equation for generating a predetermined chroma correction gain for each correction region; and
- a first chroma correction step of correcting the chroma of the pixel in each correction region by a calculation using the first and second color difference signals and first chroma correction gain.

43. The video correction program according to claim 41, further comprising: a second chroma correction gain calculation step of using the angle of each input pixel calculated in the angle calculation step as the parameter to set a chroma correction gain for correcting chroma of the pixel of the video signal to zero outside the correction regions and to calculate a second chroma correction gain for correcting the chroma of the pixel in each correction region based on a second chroma correction gain calculation equation for generating a predetermined chroma correction gain for each correction region; and
- a second chroma correction step of multiplying each of the first and second color difference signals by the second chroma correction gain and first correction function, and adding each multiplication result to the respective first and second color difference signals to correct the chroma of the pixel in each correction region.

44. The video correction program according to claim 41, wherein the hue correction step comprises: moving a chromaticity point of each pixel in each correction region in a direction crossing at right angles to each isochromatic line connecting an intersection of the first and second axes to each pixel in each correction region.

45. The video correction program according to claim 41, wherein the hue correction step comprises: moving a chromaticity point of each pixel in each correction region in a rotation direction on the color difference plane.

46. The video correction program according to claim 42, wherein the first chroma correction step comprises: moving a chromaticity point of each pixel in each correction region in a direction extending in parallel with each isochromatic line connecting an intersection of the first and second axes to each pixel in each correction region.

47. A video correction program for causing a computer, when executing the video correction program, to function as a video correction apparatus for setting one or a plurality of angle regions on a color difference plane formed by first and second axes as correction regions, and correcting video in the correction regions, when one of first and second color difference signals which are color signal components of a pixel of a video signal is used as the first axis, and the other of the first and second color difference signals is used as the second axis crossing at right angles to the first axis, the program comprising:
- an angle calculation step of calculating an angle formed by components of the first and second color difference signals of each input pixel on the color difference plane;
- a hue correction gain calculation step of using the angle of each input pixel calculated in the angle calculation step as a parameter to set a hue correction gain for correcting hue of the pixel of the video signal to zero outside the correction regions and to calculate the hue correction gain for correcting the hue of the pixel in each correction region based on a hue correction gain calculation equation for generating a predetermined hue correction gain for each correction region; and
- a hue correction step of correcting the hue of the pixel in each correction region by a calculation using the first and second color difference signals and hue correction gain;
- wherein the hue correction gain calculation equation includes a second correction function for moving the chromaticity points of the pixels in second and third angle regions in opposite directions with respect to each other, and a third correction function for moving the chromaticity points of the pixels in the second and third angle regions in the same direction with respect to each other, when the correction region is set as a first angle region surrounded with first and second isochromatic lines and the first angle region is divided into two by a third isochromatic line as a center line of the first angle region to form the second and third angle regions.

48. The video correction program according to claim 41, wherein the first correction function is a function having a characteristic that luminance or chroma of the pixel of the video signal is subjected to gamma correction.

49. A video correction program stored in a computer readable medium, for causing a computer, when executing the video correction program, to function as a video correction apparatus for setting a plurality of angle regions on a color difference plane formed by first and second axes as a plurality of correction regions, and correcting video in the correction regions, when one of first and second color difference signals which are color signal components of a pixel of a video signal is used as the first axis, and the other of the first and second color difference signals is used as the second axis crossing at right angles to the first axis, the program comprising:
   an angle calculation step of calculating an angle formed by components of the first and second color difference signals of each input pixel on the color difference plane;
   a plurality of hue correction gain calculation steps of using the angle of each input pixel calculated in the angle calculation step as a parameter to set a hue correction gain for correcting hue of the pixel of the video signal to zero outside the correction regions and to calculate the hue correction gain for correcting the hue of the pixel in each correction region with respect to the plurality of correction regions based on a hue correction gain calculation equation for generating a predetermined hue correction gain for each correction region;
   a first accumulation step of accumulating the hue correction gains for the plurality of correction regions calculated in the plurality of hue correction gain calculation steps; and
   a hue correction step of correcting the hue of the pixel in each correction region by a calculation using the first and second color difference signals and the hue correction gains accumulated in the first accumulation step.

50. The video correction program according to claim 49, further comprising: a plurality of first chroma correction gain calculation steps of using the angle of each input pixel calculated in the angle calculation step as the parameter to set a chroma correction gain for correcting chroma of the pixel of the video signal to zero outside the correction regions and to calculate a first chroma correction gain for correcting the chroma of the pixel in each correction region with respect to the plurality of correction regions based on a first chroma correction gain calculation equation for generating a predetermined chroma correction gain for each correction region;
   a second accumulation step of accumulating the first chroma correction gains for the plurality of correction regions calculated in the plurality of first chroma correction gain calculation steps; and
   a first chroma correction step of correcting the chroma of the pixel in each correction region by a calculation using the first and second color difference signals and first chroma correction gains accumulated in the second accumulation step.

51. The video correction program according to claim 49, further comprising: a plurality of luminance correction gain calculation steps of using the angle of each input pixel calculated in the angle calculation step as the parameter to set a luminance correction gain for correcting luminance of the pixel of the video signal to zero outside the correction regions and to calculate the luminance correction gain for correcting the luminance of the pixel in each correction region with respect to the plurality of correction regions based on a luminance correction gain calculation equation for generating a predetermined luminance correction gain for each correction region;
   a third accumulation step of accumulating the luminance correction gains for the plurality of correction regions calculated in the plurality of luminance correction gain calculation steps; and
   a luminance correction step of multiplying a first correction function for correcting a luminance signal component of the pixel of the video signal by the luminance correction gains accumulated by the third accumulation step, and adding the multiplication result to the luminance signal component to correct the luminance of the pixel of the video signal.

52. The video correction program according to claim 50, further comprising: a plurality of luminance correction gain calculation steps of using the angle of each input pixel calculated in the angle calculation step as the parameter to set a luminance correction gain for correcting luminance of the pixel of the video signal to zero outside the correction regions and to calculate the luminance correction gain for correcting the luminance of the pixel in each correction region with respect to the plurality of correction regions based on a luminance correction gain calculation equation for generating a predetermined luminance correction gain for each correction region;
   a third accumulation step of accumulating the luminance correction gains for the plurality of correction regions calculated in the plurality of luminance correction gain calculation steps; and
   a luminance correction step of multiplying a first correction function for correcting a luminance signal component of the pixel of the video signal by the luminance correction gains accumulated by the third accumulation step, and adding the multiplication result to the luminance signal component to correct the luminance of the pixel of the video signal.

53. The video correction program according to claim 51, further comprising: a plurality of second chroma correction gain calculation steps of using the angle of each input pixel calculated in the angle calculation step as the parameter to set a chroma correction gain for correcting chroma of the pixel of the video signal to zero outside the correction regions and to calculate a second chroma correction gain for correcting the chroma of the pixel in each correction region with respect to the plurality of correction regions based on a second chroma correction gain calculation equation for generating a predetermined chroma correction gain for each correction region;
   a fourth accumulation step of accumulating the second chroma correction gains for the plurality of correction regions calculated in the plurality of second chroma correction gain calculation steps; and
   a second chroma correction step of multiplying each of the first and second color difference signals by the second chroma correction gains accumulated in the fourth accumulation step and the first correction function, and adding each multiplication result to the respective first and second color difference signals to correct the chroma of the pixel in each correction region.

54. The video correction program according to claim 52, further comprising: a plurality of second chroma correction gain calculation steps of using the angle of each input pixel calculated in the angle calculation step as the parameter to set a chroma correction gain for correcting chroma of the pixel of the video signal to zero outside the correction regions and to calculate a second chroma correction gain for correcting the chroma of the pixel in each correction region with respect to the plurality of correction regions based on a second chroma correction gain calculation equation for generating a predetermined chroma correction gain for each correction region;

a fourth accumulation step of accumulating the second chroma correction gains for the plurality of correction regions calculated in the plurality of second chroma correction gain calculation steps; and a second chroma correction step of multiplying each of the first and second color difference signals by the second chroma correction gains accumulated in the fourth accumulation step and the first correction function, and adding each multiplication result to the respective first and second color difference signals to correct the chroma of the pixel in each correction region.

55. The video correction program according to claim 49, wherein the hue correction step comprises: moving a chromaticity point of each pixel in each correction region in a direction crossing at right angles to each isochromatic line connecting an intersection of the first and second axes to each pixel in each correction region.

56. The video correction program according to claim 49, wherein the hue correction step comprises: moving a chromaticity point of each pixel in each correction region in a rotation direction on the color difference plane.

57. The video correction program according to claim 50, wherein the first chroma correction step comprises: moving a chromaticity point of each pixel in each correction region in a direction extending in parallel with each isochromatic line connecting an intersection of the first and second axes to each pixel in each correction region.

58. The video correction program according to claim 49, wherein the hue correction gain calculation equation includes a second correction function for moving the chromaticity points of the pixels in second and third angle regions in opposite directions with respect to each other, and a third correction function for moving the chromaticity points of the pixels in the second and third angle regions in the same direction with respect to each other; when the correction region is set as a first angle region surrounded with first and second isochromatic lines and the first angle region is divided into two by a third isochromatic line as a center line of the first angle region to form the second and third angle regions.

59. The video correction program according to claim 51, wherein the first correction function is a function having a characteristic that luminance or chroma of the pixel of the video signal is subjected to gamma correction.

60. The video correction program according to claim 52, wherein the first correction function is a function having a characteristic that luminance or chroma of the pixel of the video signal is subjected to gamma correction.

* * * * *